(12) United States Patent
Nakaoki et al.

(10) Patent No.: US 7,940,606 B2
(45) Date of Patent: May 10, 2011

(54) SIGNAL DETECTING DEVICE AND SIGNAL DETECTING METHOD

(75) Inventors: Ariyoshi Nakaoki, Tokyo (JP); Naoto Kojima, Kanagawa (JP); Koji Sekiguchi, Kanagawa (JP); Osamu Kawakubo, Saitama (JP); Kazuhiko Fujiie, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 12/481,061

(22) Filed: Jun. 9, 2009

(65) Prior Publication Data

US 2009/0310446 A1    Dec. 17, 2009

(30) Foreign Application Priority Data

Jun. 11, 2008  (JP) ................................ 2008-153184
Dec. 26, 2008  (JP) ................................ 2008-334888

(51) Int. Cl.
*G11B 11/00* (2006.01)

(52) U.S. Cl. ......................... 369/13.33; 385/131; 257/17
(58) Field of Classification Search ............... 369/13.33, 369/13.02, 13.13, 13.17, 112.23, 300; 257/17, 257/18, 21, 22, 195, 436; 385/131
See application file for complete search history.

(56) References Cited

U.S. PATENT DOCUMENTS 5,285,514 A * 2/1994 Nojiri et al. ................... 385/131
5,521,397 A * 5/1996 Zhang ............................. 257/17

\* cited by examiner

*Primary Examiner* — Ali Neyzari
(74) *Attorney, Agent, or Firm* — Wolf, Greenfield & Sacks, P.C.

(57) ABSTRACT

A signal detecting device includes: a semiconductor substrate; a near-field light generating section that is provided on the semiconductor substrate and generates near-field light near an interface with the semiconductor substrate; a light source that outputs light having wavelength corresponding to photon energy about a half as large as band-gap energy of a material of the semiconductor substrate; and a current detecting unit that detects a photocurrent generated in the semiconductor substrate when the near-field light is generated.

15 Claims, 15 Drawing Sheets

1: NEAR-FIELD LIGHT GENERATING SECTION
2: ELECTRODE
3: SEMICONDUCTOR SUBSTRATE
4: CURRENT DETECTING MEANS
100: RECORDING MEDIUM
103: RECORDING SECTION
103a: RECORDING AREA
103b: NON-RECORDING AREA

1: NEAR-FIELD LIGHT GENERATING SECTION
2: ELECTRODE
3: SEMICONDUCTOR SUBSTRATE
4: CURRENT DETECTING MEANS
100: RECORDING MEDIUM
103: RECORDING SECTION
103a: RECORDING AREA
103b: NON-RECORDING AREA

SIGNAL DETECTING DEVICE AND SIGNAL DETECTING METHOD

BACKGROUND OF THE INVENTION

1. Field of the Invention

The present invention relates to a signal detecting device and a signal detecting method for detecting a signal recorded on a recording medium using near-field light.

2. Description of the Related Art

A light recording and reproducing method employing near-field light attracts attention as a technique for realizing an ultra-high density storage because the technique can realize high resolution regarded as a limit of a normal optical system. For example, when a so-called near-field light lens such as a solid immersion lens (SIL) is used, it is considered possible to reduce a spot diameter up to about 100 nm.

It is expected that surface recording density 1 Tbit/inch$^2$ will be realized in a hard disk around the year of 2012. However, to realize recording density equivalent to the surface recording density, it is necessary to set a spot diameter to be equal to or smaller than 20 nm.

Therefore, in order to reduce further reduction in the spot diameter, researches and developments making use of local light spot formation by the plasmon resonance phenomenon are actively performed. It is expected that the density of a phase change optical recording system is increased by applying the local light spot to a phase change medium.

On the other hand, it is considered difficult to reproduce ultra-high density recorded information using near-field light because it is difficult to directly observe the near-field light.

As measures against this difficulty, there is proposed a method of irradiating observation light on a sample and irradiating reference light on a cantilever arranged in a position different from a signal detection position of the sample or near the sample, comparing the reference light and the observation light, and detecting near-field light according to a phase difference between the reference light and the observation light (see F. Zenhausern, et al. "Apertureless near-field optical microscope", Appl. Aphys. Lett., 65(13), 1994 (Non-Patent Document 1) and Y. Martin, et al. "Optical data storage read out at 256 Gbits/in.2", Appl. Phys. Lett., 71(1), 1997 (Non-Patent Document 2)).

There is also proposed a technique for providing a scatterer shot-key joined on a semiconductor substrate, causing surface plasmon and exciting a carrier in the semiconductor substrate to thereby use the scatterer as a near-field probe (see JP-A-2002-368253).

SUMMARY OF THE INVENTION

However, in the methods proposed in Non-Patent Documents 1 and 2, optical systems are complicated. Further, since a detection signal is given as a slight phase difference, it is necessary to detect the signal with, for example, a lock-in amplifier. Therefore, the methods also have a problem in terms of detection speed (transfer speed) or the like In JP-A-2002-368253, the carrier excited in the shot-key joint portion is detected to find that an electric current proportional to incident light intensity flows between the semiconductor substrate and the scatterer. However, a specific reproducing method employing this technique is not described. In other words, there is no proposal concerning how to reflect information recorded on a recording medium, for example, a recording mark formed by an uneven pit, a reflectance change, or the like on the intensity of near-field light to thereby change the electric current proportional to the incident light intensity and reproduce the signal.

Therefore, it is desirable to provide a new signal detecting device and a new signal detecting method that makes it possible to reproduce high-density recorded information using near-field light.

According to an embodiment of the present invention, there is provided a signal detecting device including: a semiconductor substrate; and a near-field light generating section that is provided on the semiconductor substrate and generates near-field light near an interface with the semiconductor substrate. The signal detecting device further includes: a light source that outputs light having wavelength corresponding to photon energy about a half as large as band-gap energy of a material of the semiconductor substrate; and a current detecting unit that detects a photocurrent generated in the semiconductor substrate when the near-field light is generated.

According to another embodiment of the present invention, there is provided a signal detecting method in which a near-field light generating section provided on a semiconductor substrate is caused to travel opposed to and relatively to a recording medium having a recording section, a dielectric constant of which changes according to recorded information. Light having wavelength corresponding to photon energy about a half as large as band-gap energy of a material of the semiconductor substrate is irradiated on the near-field light generating section to generate near-field light near an interface between the near-field light generating section and the semiconductor substrate. The surface of the recording section, the dielectric constant of which changes, of the recording medium and the near-field light generating section are caused to interact to change near-field light intensity in the semiconductor substrate. A change in photocurrent excited by absorption of two photons of the near-field light in the semiconductor substrate is changed to detect the recorded information of the recording medium.

According to still another embodiment of the present invention, there is provided a recording medium in which a signal corresponding to recorded information is detected by the signal detecting method. The recording medium includes a recording section made of a material, a dielectric constant of which changes according to recorded information. Light having wavelength corresponding to photon energy about a half as large as band-gap energy of a material of a semiconductor substrate is irradiated on a near-field light generating section in a state in which the near-field light generating section provided in the semiconductor substrate is caused to travel opposed to and relatively to the recording section. When the light is irradiated, near-field light intensity generated near an interface between the near-field light generating section and the semiconductor substrate is changed according to the change in the dielectric constant of the recording section.

As explained above, in the signal detecting device and the signal detecting method according to the embodiments of the present invention, the near-field light generating section is provided on the semiconductor substrate and the light having the wavelength corresponding to the photon energy about a half as large as the band-gap energy of the material of the semiconductor substrate is irradiated on the near-field light generating section.

When the light is irradiated, a state in which light density (energy density) is sufficiently high near the interface between the near-field light generating section and the semiconductor substrate is created by the near-field light, whereby a two-photon absorption phenomenon occurs in an area with high energy density and a photocurrent is generated following generation of an electron and hole pair.

On the other hand, the near-field light generating section is moved opposed to and relatively to the recording medium having the recording section, a dielectric constant of which changes according to recorded information. Then, since the surface of the recording section, a dielectric constant of which changes, and the near-field light generating section interact, near-field light intensity in the semiconductor substrate changes. Photocurrent excited by the two-photon absorption also changes according to the change.

Therefore, it is possible to detect a signal corresponding to recorded information recorded on the recording medium by detecting the change in the photocurrent generated in the semiconductor substrate.

According to the embodiments of the present invention, it is possible to reproduce an information signal recorded at high density using near-field light.

DESCRIPTION OF THE PREFERRED EMBODIMENTS

Figure 1:
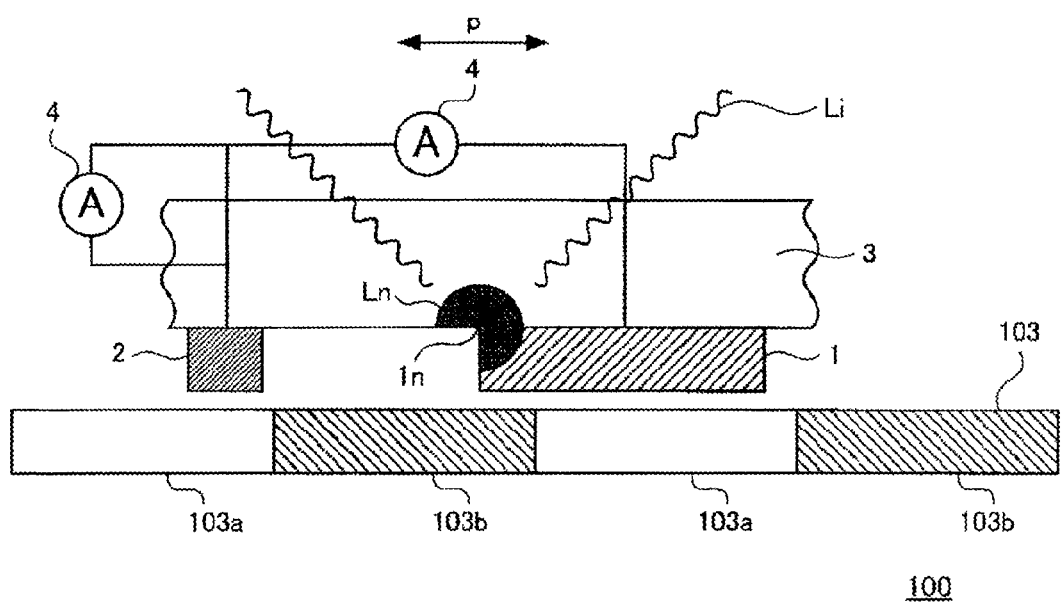
FIG. 1 is an enlarged sectional view of a main part of a signal detecting device according to a first embodiment of the present invention.

Embodiments of the present invention are explained in detail below with reference to the accompanying drawings. However, the present invention is not limited to the embodiments. The embodiments are explained in the following order:

1. First Embodiment [Configuration of a signal detecting device]

(1) Configuration of a near-field light generating section (2) Materials and arrangement of the near-field light generating section and an electrode (3) Plane configuration of the near-field light generating section and the electrode (4) Material of a semiconductor substrate (5) Light source (6) Configuration of the signal detecting device (7) Operation of the signal detecting device (a signal detecting method)

2. Second Embodiment [Configuration of a recording medium]

(1) First configuration example of the recording medium (Example in which recording particulates are arranged are columnar structures)

(2) Second configuration example of the recording medium (Example in which recording particulates are arranged on columnar structures made of a material different from that of a substrate)

(3) Third configuration example of the recording medium (Example in which recording particulates are arranged in recesses)

(4) Fourth configuration example of the recording medium (Example in which a material different from that of the substrate and recording particulates are arranged in the recesses)

(5) Analysis example of a recording particulate shape

1. First Embodiment

Configuration of a Signal Detecting Device (1) Configuration of a Near-Field Light Generating Section FIG. 1 is a diagram for explaining a signal detecting method according to a first embodiment of the present invention and is a schematic enlarged diagram of a main part of a signal detecting device according to this embodiment. In FIG. 1, a near-field light generating section 1 provided on a semiconductor substrate 3 of the signal detecting device is opposed to a recording section 103 of a recording medium 100. The near-field light generating section 1 and an electrode 2 are formed on the semiconductor substrate 3. A current detecting unit 4 is connected to the electrode 2. Incident light Li is irradiated from a not-shown light source. Near-field light is generated in a near-field light generation position in at one end of the near-field light generating section 1. The incident light Li is irradiated such that a field oscillation direction p thereof coincides with a predetermined direction explained later in the near-field light generating section 1. Therefore, near-field light intensity can be increased. A configuration of the recording medium 100 is explained later.

(2) Materials and Arrangement of the Near-Field Light Generating Section and the Electrode As the near-field light generating section 1, a scatterer in which near-field light is generated by an action of surface plasmon through the irradiation of the incident light Li, a so-called antenna (a plasmon antenna) can be used. As a material of the scatterer, a material including, for example, any one of Pt, Mg, Au, Ag, and Al or any one of Pt, Mg, Au, Ag, and Al can be used. The near-field light generating section 1 only has to be arranged in a position facing the surface of the semiconductor substrate 3 in order to sufficiently obtain a mutual action with the recording medium 100. The near-field light generating section 1 is more desirably arranged in a shape projecting from the surface or a shape, at least a part of which is exposed from the surface.

The electrode 2 only has to be made of a conductive material. The electrode 2 may be made of a material same as that of the near-field light generating section 1 or may be a material different from that of the near-field light generating section 1. In an example shown in the figure, the electrode 2 is formed near the near-field light generating section 1. However, the electrode 2 may be formed in other positions as long as a photocurrent generated in the semiconductor substrate 3 can be detected in the positions. For example, the electrode 2 may be formed in a shape extending to the inside of the semiconductor substrate 3 without hindering the propagation of incident light in the semiconductor substrate 3. In particular, the electrode 2 may be formed in a shape, a part of which extends to the vicinity of the near-field light generation position 1n.

In order to prevent damage due to collision or the like with the recording medium 100, for example, a pad made of a porous material or the like may be provided around the near-field light generating section 1 or, for protection of the electrode 2, the electrode 2 or the electrode 2 may be covered with a dielectric layer. Further, a light blocking film or the like having an opening shaped not to interfere with an effective diameter of the incident light Li may be provided on a light incident side of the rear surface of the semiconductor substrate 3.

(3) Plane Configuration of the Near-Field Light Generating Section and the Electrode A plane configuration of the near-field light generating section 1 and the electrode 2 is explained with reference to FIGS. 2A to 2C. In an example shown in the FIGS. 2A to 2C, the near-field light generating section 1 is formed in a substantially planer triangular shape. However, a shape of the near-field light generating section 1 is not limited to this. The near-field light generating section 1 can be formed in various shapes such as a bar shape and a shape tapered at one end and widened in a fan shape at the other end. In this case, it is desirable to machine the near-field light generating section 1 in a tapered sharp shape such that energy concentration due to plasmon resonance occurs at one end (one vertex in the example shown in FIG. 2A) as a center position of the incident light Li. This makes it possible to increase generated near-field light intensity. It is desirable to form the end in the near-field light generation position in in a shaper than the other areas. A direction toward the opposite side of an ends is set as a direction along the field oscillation direction p of the incident light Li (a longitudinal direction) The length along this direction is selected according to a condition under which surface plasmon is generated. By adopting such a configuration, it is possible to further increase the near-field light intensity.

Figure 2A:
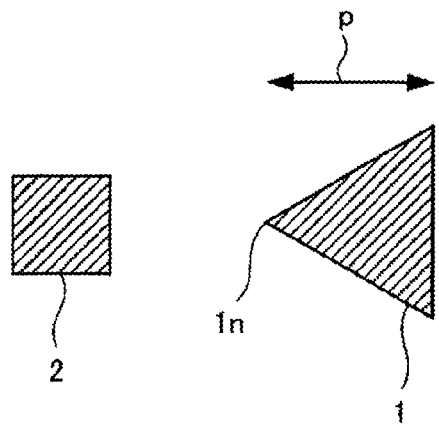
FIGS. 2A to 2C are enlarged plan views of the main part of the signal detecting device according to the first embodiment.
Figure 2B:
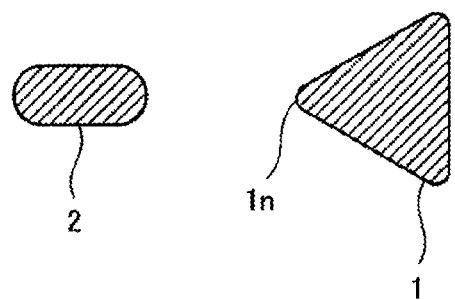
Figure 2C:
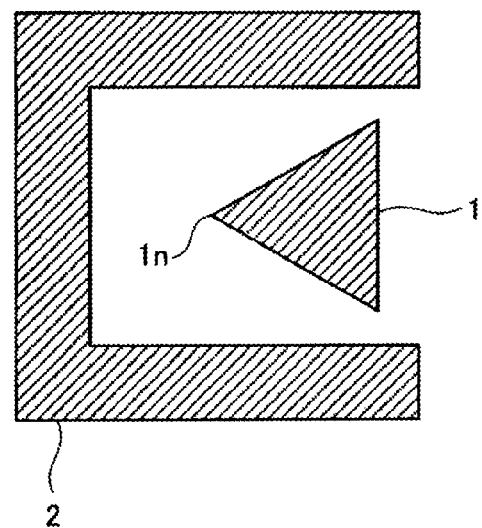

In the example shown in FIG. 2A, the electrode 2 is formed in a planar square shape. However, the electrode 2 may be formed in a triangular shape same as the near-field light generating section 1. Alternatively, as shown in FIG. 2B, the electrode 2 may be formed in a bar shape rounded at an end. Similarly, as indicated by the example shown in FIG. 2B, the near-field light generating section 1 may be formed in a shape rounded at vertexes of a triangle. Further, for example, the near-field light generating section 1 may be arranged such that the vertexes of the triangle are opposed to one another. Alternatively, as shown in FIG. 2C, a portion extending along the field oscillation direction of the incident light Li may be provided in the electrode 2. In short, the planar shape of the electrode 2 can be various shapes as long as the near-field light intensity in the near-field light generation position in is intensified. As explained above, a portion extending to the inside of the semiconductor substrate 3 may be provided as long as the portion does not hinder the propagation of the incident light in the semiconductor substrate 3.

(4) Material of the Semiconductor Substrate

As a material of the semiconductor substrate 3, a material sufficiently having transparency with respect to the wavelength of a light source is used. The semiconductor substrate 3 is made of a material having a band gap about twice as large as photon energy of the incident light Li irradiated on the near-field light generating section 1. In other words, the material of the semiconductor substrate 3 is selected such that photon energy of the incident light Li incident on the near-field light generating section 1 is about a half as large as band-gap energy of the material. Further the material of the semiconductor substrate 3 is selected such that photon energy of the incident light Li is equal to or smaller than band-gap energy of the material.

Figure 3:
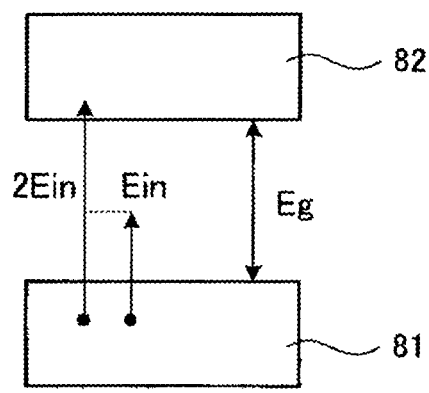
FIG. 3 is a diagram for explaining a relation between incident light energy and band-gap energy.

As schematically shown in FIG. 3, an energy gap between a valence band 81 and a conduction band 82 in the semiconductor substrate 3 is represented as Eg. It is assumed that emitted light of a light source includes light in a wavelength band, which is photon energy Ein. In this case, it is desirable to select the light source and the semiconductor substrate 3 to satisfy a condition Ein≦Eg≦2Ein. In other words, if the semiconductor substrate 3 made of a material satisfying a condition Eg≦2Ein is used, it is possible to use the two-photon absorption phenomenon. Further, if the semiconductor substrate 3 satisfying a condition Ein≦Eg is used, one-photon absorption does not occur and it is possible to generate a photocurrent only in a very small area with high energy density in a spot of the incident light Li. It is possible to surely generate high density.

As conversion of wavelength and photon energy, when a Planck's constant is represented as h, light velocity is represented as c, charge is represented as e, and wavelength is represented as λ, the wavelength and the photon energy are approximately converted according to the following formula:

$$E[eV]=h[Js] \times c[m/s]/(\lambda[m] \times e[C])=1240/\lambda[nm]$$

As a material of the semiconductor substrate 3, it is desirable to select any one of SiC, AlP, ZnO, ZnS, ZnSe, GaN, and $TiO_2$. Band gaps of these materials are as follows:

SiC: 3.0 eV

AlP: 2.5 eV

ZnO: 3.2 eV

ZnS: 3.6 eV

ZnSe: 2.6 eV

GaN: 3.4 eV $TiO_2$: 3.0 eV

A wavelength band that has photon energy about a half as large as band-gap energy in this range of the band gaps and equal to or smaller than the band gap energy is 344 nm to 992 nm. Wavelength in this range satisfies the condition of the wavelength explained above. In other words, if a light source in this wavelength range is used, it is possible to use the semiconductor material explained above.

For example, a light source with center wavelength 400 nm is used, photon energy of the light source is converted into about 3.1 eV. Therefore, when ZnS having the largest band gap among the materials is used as a material of the semiconductor substrate 3, photon energy is equal to or larger than a half of band-gap energy and is equal to or smaller than the band-gap energy. When GaN is used as the semiconductor substrate 3, band-gap energy is 3.4 eV. This also satisfies the condition that the photon energy is equal to or larger than a half of band-gap energy and is equal to or smaller than the band-gap energy.

(5) Type and Arrangement of the Light Source

As a light source (not shown) that irradiates the light Li on the near-field light generating section 1 via the semiconductor substrate 3, a light source in which emitted light includes light having wavelength explained below is used. First, when the emitted light is irradiated with the field oscillation direction p thereof set in a predetermined direction of the near-field light generating section 1, wavelength is selected to match a shape and a material of the near-field light generating section 1 such that plasmon resonance is caused. As a wavelength band of the emitted light is selected as explained below according to the material of the semiconductor substrate 3 explained above.

A light source that can be applied when the semiconductor substrate materials SiC, AlP, ZnO, ZnS, ZnSe, GaN, and $TiO_2$ are used only has to be a light source in which emitted light includes light having any one of wavelengths in the wavelength band equal to or larger than 344 nm and equal to or smaller than 992 nm or wavelength in a predetermined range. For example, in a light source in which center wavelength of emitted light is 340 nm, if light having wavelength equal to or larger than 344 nm is included in the emitted light to some extent, the light source can be used, for example, when ZnS (having the band gap of 3.6 eV) is used as the material of the semiconductor substrate 3.

Similarly, if light having wavelength equal to or smaller than 992 nm is included in emitted light to some extent in a light source in which center wavelength of emitted light is 1000 nm, the light source can be used when AlP (having the band gap of 2.5 eV) is used as the material of the semiconductor substrate 3. Therefore, when the semiconductor substrate materials are used, it is possible to use a light source in which center wavelength of emitted light is equal to or larger than 340 nm and equal to or smaller than 1000 nm.

As a type of the light source, it is possible to use various light sources such as a semiconductor laser, a solid-state laser, a gas laser, and a second harmonic and a third harmonic obtained by wavelength conversion.

A light incident direction is not limited to a direction from the semiconductor substrate 3 side shown in FIG. 1. The light may be made incident from a surface side of the near-field light generating section 1. The light may be irradiated from a lateral direction along the surface of the semiconductor substrate 3, an oblique direction, or the like or may be irradiate from two or more directions among these directions.

(6) Configuration of the Signal Detecting Device

Figure 4:
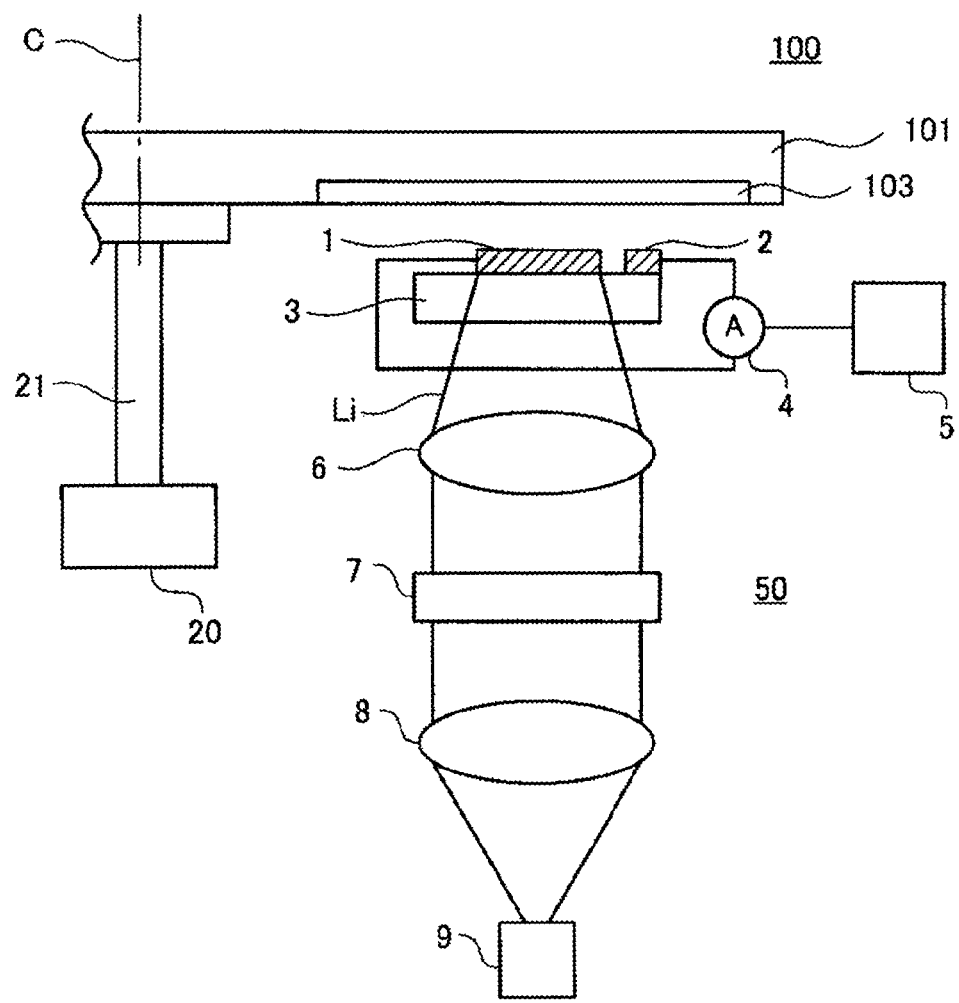
FIG. 4 is a schematic diagram of the signal detecting device according to the first embodiment.

A schematic diagram of a signal detecting device 50 according to this embodiment opposed to the disk-like recording medium 100 is shown in FIG. 4. The recording medium 100 is not limited to a disk-like recording medium and may be, for example, a card-like recording medium. In this example, as shown in FIG. 4, the recording medium 100 includes, on the substrate 101, a recording section 103 in which a signal is recorded according to the change in a dielectric constant. The recording medium 100 is fixed to and supported by a supporting section 21 rotated by a driving unit 20 such as a spindle motor and rotates with an alternate long and short dash line C as a center axis.

The near-field light generating section 1 of the signal detecting device 50 is arranged near and opposed to the recording section 103 of the recording medium 100. Although not shown in the figure, the semiconductor substrate 3 on which the near-field light generating section 1 and the electrode 2 are formed is supported by a biaxial or triaxial actuator or the like and is arranged near and opposed to a desired position of the recording section 103 by a control system (not shown) during the start. The current detecting unit 4 is provided between the near-field light emitting section 1 and the electrode 2 on the semiconductor substrate 3. A signal due to a current change is detected by a detecting unit 5.

Further, optical systems are arranged in the near-field light generating section 1 such that the incident light L1 is irradiated through the semiconductor substrate 3. In the example shown in FIG. 4, optical systems such as a collimate lens 8, a polarizer 7, and a condensing lens 6 are arranged between the light source 9 that outputs the light having the wavelength explained above and the semiconductor substrate 3. The light emitted from the light source 9 is changed to parallel light by the collimate lens 8, set in a predetermined polarizing direction by the polarizer 7, condensed by the condensing lens 6, and irradiated from a rear surface side of the semiconductor substrate 3 toward the near-field light generating section 1. Although not shown in the figure, for example, a mechanism for allowing the entire signal detecting device 50 to move in a radial direction of the disk-like recording medium 100 is provided in the signal detecting device 50. The near-field light generating section 1 is arranged to be opposed to the entire surface of a recording area of the recording medium 100.

(7) Operation of the Signal Detecting Device (A Signal Detecting Method)

As an example, operation for detecting a signal recorded in the recording section 103 made of a phase change material of the recording medium 100 in the signal detecting device 50 according to this embodiment is explained with reference to FIG. 1.

By using the near-field light generating section 1, the semiconductor substrate 3, and the light source 9 made of the materials and having the configurations explained above, as shown in FIG. 1, near-field light can be generated in an interface between the near-field light generating section 1 and the semiconductor substrate 3. A photocurrent generated by two-photon absorption can be detected by the current detecting unit 4. A form of this operation is explained below.

It is assumed that the near-field light generating section 1 is formed as a scatterer made of metal such as Au on the semiconductor substrate 3 made of GaN or the like. The electrode 2 made of, for example, the same material is formed in a separate position on the semiconductor substrate 3. Fixed voltage is applied between the near-field light generating section 1 and the electrode 2 by a not-shown voltage applying unit.

A material of the recording section 103 of the recording medium 100 only has to be a material in which information is recorded according to a change in a dielectric constant. For example, a phase change material such as GeSbTe can be used. As shown in FIG. 1, a recording area 103a and a non-recording area 103b are formed by phase change in advance according to recording information. As a material of the recording section 103, other than the phase change material, a material in which a sufficient change in a dielectric constant occurs can be applied. Further, as shown in FIG. 1, a shape of the recording section 103 is not limited to the planer surface shown in FIG. 1 and can be various shapes. Uneven structure or the like may be present on the recording section 103. A specific configuration example of such a recording medium 100 is explained in detail later in a second embodiment of the present invention.

The near-field light generating section 1 is arranged to be opposed, for example, at a distance of about several nanometers, to the recording medium 100 on which the recording area 103a and the non-recording area 103b are formed. In this state, light is irradiated from the light source 9 such as a semiconductor laser diode on the near-field light generating section 1 from the semiconductor substrate 3 side. As explained above, since the field oscillation direction p of the incident light Li and the longitudinal direction of the near-field light generating section 1 are set in the same direction and the length and the like in the longitudinal direction are appropriately selected, surface plasmon is generated. According to the generation of the surface plasmon, near-field light Ln is generated in an area including the inside of the semiconductor substrate 3 in the vicinity of the near-field light generation position in at one sharpened end of the near-field light generating section 1. At this point, although not shown in the figure, near-field light is also generated on the recording medium 100 side of the near-field light generation position 1n. In principle, recording operation is also possible.

In this way, the near-field light Ln is also intensely generated in the semiconductor substrate 3 set in contact with the near-field light generating section 1. As explained above, materials of the light source 9 and the semiconductor substrate 3 are selected such that, in the light source 9, light having a wavelength corresponding to about a half as large as band-gap energy of the material of the semiconductor substrate 3 is included in emitted light. For example, when the semiconductor substrate 3 is made of GaN, the band-gap energy is about 3.4 eV and the wavelength of the photon energy corresponding thereto is 365 nm. Therefore, as the light source 9, a light source in which light having wavelength λ nearly equal to 730 nm is included in emitted light is selected. With such a configuration, a two-photon absorption phenomenon occurs in an area having high energy density in the semiconductor substrate 3. A photocurrent is generated following generation of an electron and hole pair. At this point, as explained above, since the photon energy corresponding to the wavelength is equal to or lower than the band-gap energy, it is possible to dominantly generate the two-photon absorption phenomenon. This current fluctuates in tune with a change in near-field light intensity and changes in tune with a change in a signal according to a mutual action between a change in a dielectric constant in the recording section 103 and the near-field light generating section 1.

Figure 5A:
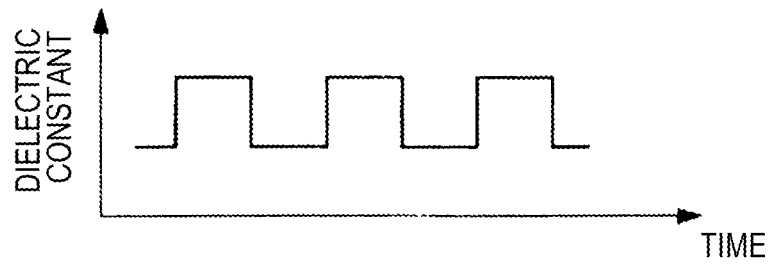
FIGS. 5A to 5D are diagrams for explaining a signal detecting method according to the first embodiment.
Figure 5B:
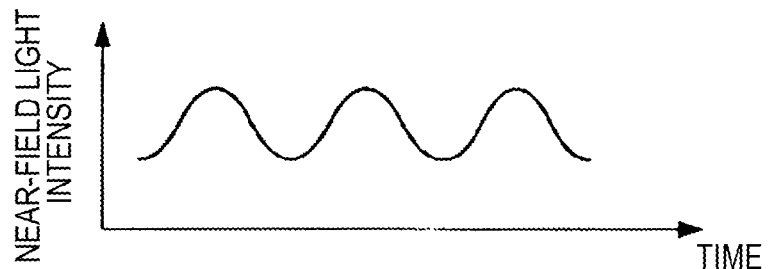

Dielectric constants of the recording area 103a and the non-recording area 103b of the recording section 103 are different. Therefore, according to relative movement of the recording medium 100 and the signal detecting device 50, as schematically shown in FIG. 5A, a dielectric constant changes with time on the surface of the recording section 103. The dielectric constant is a peculiar value decided as a response of polarization to an electric field. Therefore, a difference in near-field light intensity in the interface between the near-field light generating section 1 and the semiconductor substrate 3 as a cause of a difference in a photocurrent is caused by a degree of a mutual action of liner-field light generated on the recording medium 100 side of the near-field light generating section 1 and polarization in the recording medium 100. Since the phase change material is used for the recording medium 103, it is possible to locally change a polarization state according to a change in a phase change state and reflect the change in the polarization state on a change in a photocurrent to detect a signal. Since a state of generation of near-field light in the near-field light generating section 1 changes according to the change in the dielectric current, as schematically shown in FIG. 5B, the near-field light intensity changes. In other words, the intensity of the near-field light changes according to the mutual action of the surface of the recording section 103, a dielectric constant of which changes, and the near-field light generating section 1.

Figure 5C:
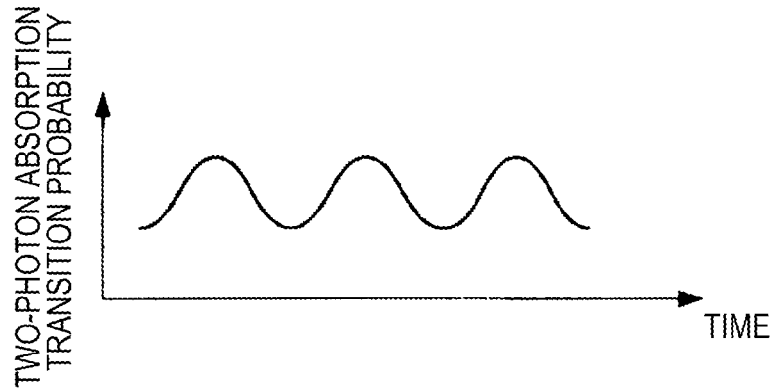
Figure 5D:
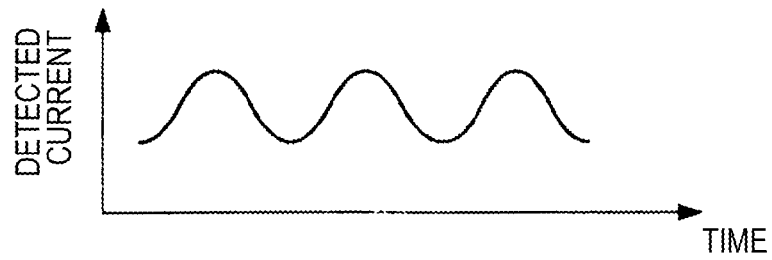

According to the change in the near-field light intensity, as schematically shown in FIG. 5C, a transition probability of generation of the two-photon absorption phenomenon fluctuates. According to the transition probability of the two-photon absorption, i.e., in tune with the near-field light intensity, as schematically shown in FIG. 5D, an electric current detected in the semiconductor substrate 3 also changes.

Therefore, the change in the detected current is converted into a signal reflecting the recording area 103a and the non-recording area 103b on the recording medium 100. The signal can be directly detected by using the near field light. The near-field light is light generated in an extremely local area. Therefore, it is possible to read a very small recording mark with a pitch equal to or smaller than about 100 nm between the recording area 103a and the non-recording area 103b in the recording section 103.

As explained above, in the signal detecting device 50 according to this embodiment, information is recorded according to a change in a dielectric constant and the near-field light generating section 1 mutually acts with the recording medium 100 that causes the change in the dielectric constant. Therefore, the near-field light intensity in the semiconductor substrate 3 changes. In particular, the wavelength of light irradiated on the near-field light generating section 1 is selected such that photon energy of the like is about a half as large as band-gap energy of the material of the semiconductor substrate 3 and is equal to or larger than the band-gap energy. This makes it possible to detect highly-densely recorded information with the near-field light at high resolution making use of a two-photon absorption process.

[2] Second Embodiment

Configuration of a Recording Medium

It is expected to increase density in the phase change optical recording system by reproducing a recorded signal of, for example, the phase change recording medium 100 including the recording section made of the material, a dielectric constant of which changes, using the signal detecting device 50 according to the first embodiment. In the implementation of the increase in the density in the phase change optical recording system, improvement of a recording and reproduction characteristic can be expected according to contrivance explained below.

When a continuous film made of a phase change material is provided as the recording section 103 in the recording medium 100, the size of a recording mark is considered to depend on the size of a light spot. When the method of irradiating near-field light with the scatterer or the like is adopted even during recording, a near-field light field rapidly may decrease when the near-field light field enters a phase change film and a distribution area may widen. As a result, an area where temperature rises to recording temperature on the phase change film may extremely widen compared with a light spot diameter formed by the original near-field light. In such a case, even if recording is performed by using the scatterer (the antenna) or the like that generates plasmon or SIL or the like, it is likely to be difficult to realize refining of a target recording mark. During signal detection by the signal detecting device 50, the rising temperature area is also considered to widen compared with the spot diameter. It is likely to be difficult to accurately reproduce a signal.

To avoid this risk, in this embodiment, a recording medium formed by regularly arraying, for example, at fixed intervals, recording particulates, which phase-changes with light or heat, on a substrate transparent to operating wavelength is used. The operating wavelength includes the wavelength of recording light used during recording. It is desirable that the operating wavelength also includes the wavelength of emitted light of the light source 9 used in the signal detecting device 50 shown in FIG. 4 and the like. During reproduction, light is irradiated with power smaller than recording power. However, it is possible to surely prevent an unnecessary phase change due to local concentration or the like of energy density. When lights in different wavelength bands are used in recording and reproduction, it is also possible to use a material transparent to only the wavelength of light during recording.

Figure 6:
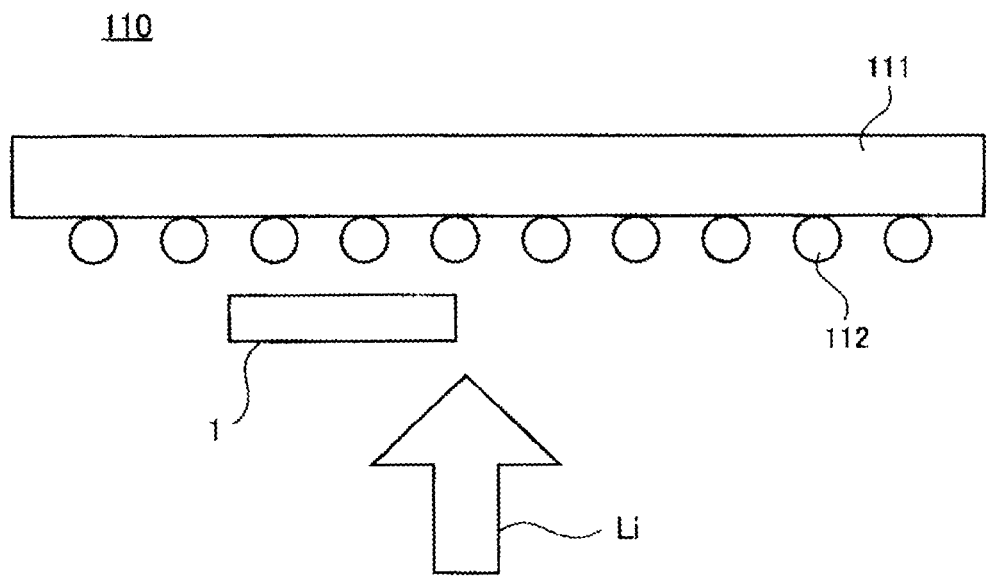
FIG. 6 is a sectional view of a recording medium used in a signal detecting method according to a second embodiment of the present invention.

FIG. 6 is a schematic sectional view of a recording medium 110 according to the second embodiment. The recording medium 110 is formed by regularly arraying recording particulates 112 on a substrate 111. The recording particulates 112 only have to be arrayed, for example, in a disk-like or card-like medium, at fixed intervals in a recording track direction and, in a direction traversing the recording track, arrayed at intervals same as or different from the intervals in the recording track direction. For example, when the recording medium 110 is a disk-like medium, the recording particulates 112 may be arrayed to gradually change the intervals in the recording track direction on an inner circumferential side and an outer circumferential side such that the intervals are fixed according to linear velocity during signal recording or reproduction. In FIG. 6, the near-field light generating section 1 in the signal detecting device 50 is arranged to be opposed to a recording section formed by the recording particulates 112 of the recording medium 110 to irradiate the incident light Li.

A method of regularly arraying the recording particulates 112 is explained later. For example, recesses or columnar structures formed on the substrate 111, which supports the recording particulates 112, are regularly arrayed and the recording particulates 112 are arranged in the recesses or on the columnar structures. By forming the recording medium 110 in this way, near-field light generated in the signal detecting device 50 is absorbed by only the recording particulates 112 and light absorption and heating in the substrate 111 of the recording medium 110 are suppressed.

Therefore, it is possible to perform high-density recording and reproduction using, for example, the signal detecting device 50. The near-field light generating section 1 and the recording particulates 112 of the recording medium 110 are arranged to face each other at distance intervals that are sufficiently smaller than wavelength and with which a mutual action sufficient for information recording and reproduction by energy irradiation occurs. In a state in which the near-field light generating section 1 and the recording particulates 112 are arranged in this way, if the incident light Li is irradiated on the near-field light generation position in, which is formed in a sharp shape, by incident light irradiation on the near-field light generating section 1, near-field light is generated by generation of surface plasmon as explained above. Therefore, it is possible to selectively irradiate energy on the recording particulates 112 that are regularly arrayed and spatially separated. When energy injection is a thermal reaction due to light absorption, since the recording particulates 112 are supported by the substrate 111 sufficiently transparent to the operating wavelength, the recording particulates 112 are thermally separated as well. Therefore, it is possible to concentratedly give energy to the recording particulates 112. It is possible to perform recording by adjusting the intensity of the incident light Li such that the near-field light irradiated on the recording particulates 112 changes to energy sufficient for recording. As a result, it is possible to perform local information recording corresponding to an outer diameter size of the recording particulates 112 with high efficiency and high resolution.

In the same state of arrangement, if the incident light Li is irradiated on the near-field light generating section 1 with energy insufficient for recording, reproduction is also possible. The near-field light intensity in the near-field light generation position in is affected by the mutual action in association with a phase change state of the recording particulates 112. A transition probability of two-photon absorption caused in the semiconductor substrate 3 in the signal detecting device 50 fluctuates. This makes it possible to reproduce information corresponding to the phase change recorded in the recording particulates 112. In the reproduction, as in the recording, since the recording particulates 112 are spatially separated from the adjacent recording particulates 112, a transition probability of two-photon absorption in the semiconductor substrate 3 is not affected by the phase change state of the adjacent recording particulates 112.

Therefore, the inconvenience that the rising temperature area widens compared with the spot diameter can be prevented and refining of the target recording mark can be realized. In other words, the surface recording density 1 Tbit/inch² is realized.

When the recording section of the recording medium 110 is formed by the recording particulates 112, since heating of the recording particulates 112 can be selectively performed, light usage efficiency is high. Since heating of peripheral particulates can be suppressed during recording, recording crosstalk is small. Further, since only an amount of incident light necessary for heating the recording particulates 112 has to be input, a necessary amount of incident light is small and recording power can be held down. This also makes it possible to reduce thermal damage to the substrate 111 of the recording medium 110.

Configuration examples of as modifications of the recording medium 110 are explained below.

(1) First Configuration Example of the Recording Medium.

Figure 7:
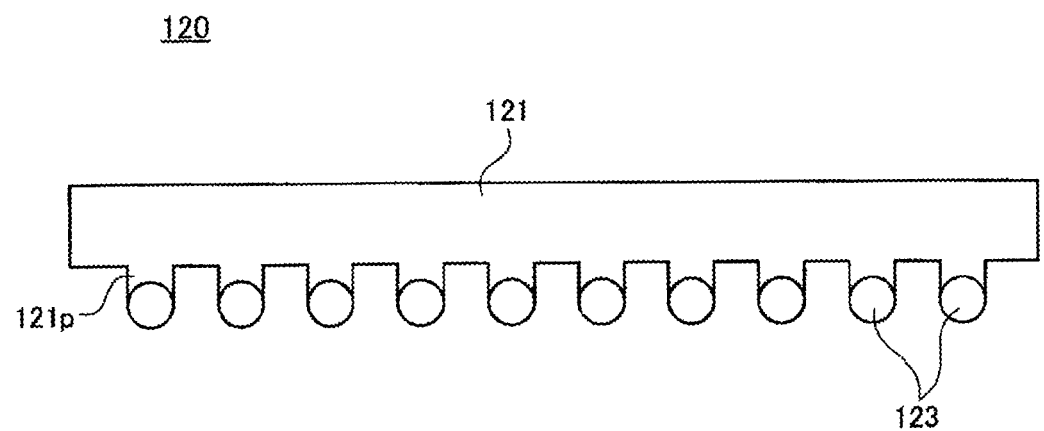
FIG. 7 is a sectional view of a recording medium used in the signal detecting method according to the second embodiment.

FIG. 7 is a sectional view of a recording medium 120 as a first configuration example. Columnar structures 121p regularly arrayed at predetermined intervals are formed on a substrate 121 transparent to operating wavelength. Recording particulates 123 made of a material, which phase-changes with light or heat, are regularly arrayed at predetermined intervals on the respective columnar structures 121p to form a recording section.

As a method of regularly arraying the recording particulates 123 on such columnar structures 121p, there is a method explained below.

Figure 8A:
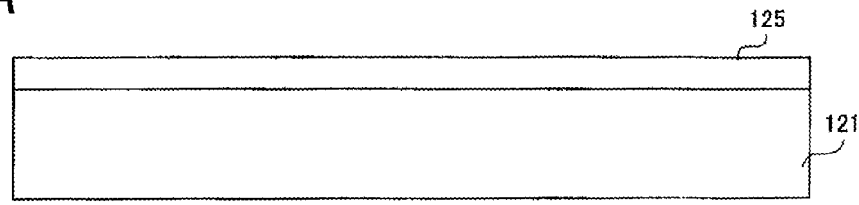
FIGS. 8A to 8E are manufacturing process charts illustrating a method of manufacturing a recording medium used in the signal detecting method according to the second embodiment.
Figure 8B:
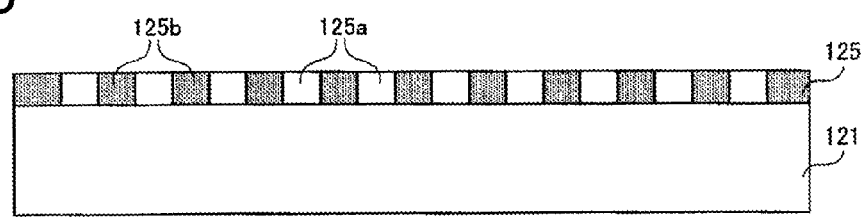

First, as shown in FIG. 8A, a resist 125 is applied by spin coating or the like on the substrate 121 transparent to operating wavelength. Subsequently, as shown in FIG. 8B, exposed areas 125a and unexposed areas 125b are formed in a predetermined array by ultraviolet ray irradiation or electron beam irradiation via a mask (not shown). After development, for example, a pattern in which the exposed areas 125a (or the unexposed area 125b depending on a type of the resist 125) remain is formed. Anisotropic etching such as RIE (reactive ion etching) is applied from one direction as indicated by an arrow e1 to form the convex columnar structures 121p on the substrate 121 as shown in FIG. 8D. Thereafter, a recording material made of a phase change material is formed over the entire surface by vapor deposition, sputtering, or the like. In order to form the isolated recording particulates 123 on the columnar structures 121p, the height of the columnar structures 121p and the thickness of the recording material are selected such that the recording particulates 123 on the columnar structures 121p and recording films 123e formed in recesses among the columnar structures 121p are prevented from coming into contact with each other.

In this case, the recording particulates 123 can be formed in a particle shape such as a spherical shape. In the example shown in the figure, the recording particulates 123 are shown in a substantial circular shape. However, the shape of the recording particulates 123 is not limited to this. The recording particulates 123 may be formed in an irregular shape and the like such as a sectional elliptical shape as long as the recording particulates 123 are separated from the adjacent other recording particulates 123. If an outer diameter (in particular, a diameter in a thickness direction) thereof is set larger than the height of the columnar structures 121p, the recording particulates 123 are surely separated from the recording films 123e among the columnar structures 121p. If the outer diameter of the recording particulates 123 is formed to be equal to or larger the width of the columnar structures 121p (if the columnar structures 121p are formed in a cylindrical shape, a diameter thereof), the volume of the recording particulates 123 is secured while the recording particulates 123 are separated from one another. In other words, it is possible to increase the number of polarizations, which contribute to coupling of near-field light and the phase change material, while keeping resolution of recording density. Therefore, it is possible to sufficiently change a dielectric constant and improve signal detection accuracy.

Figure 8C:
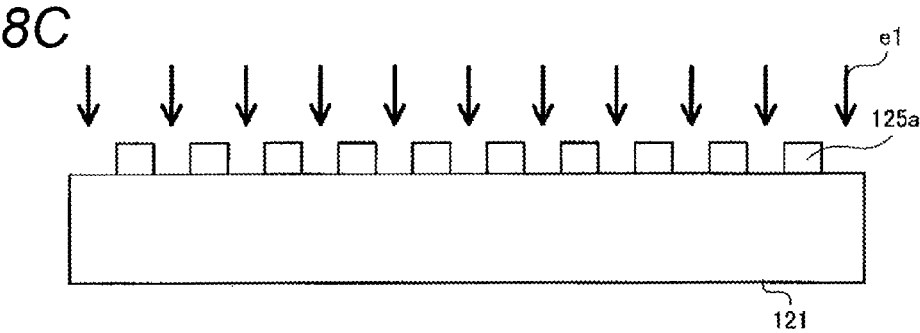
Figure 8D:
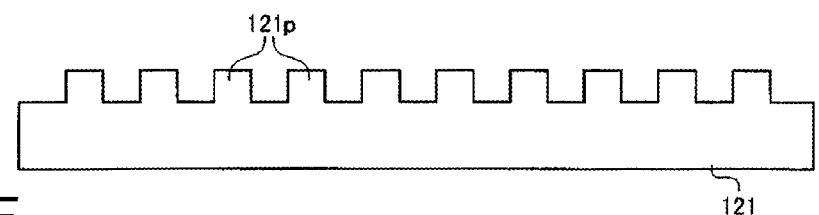
Figure 8E:
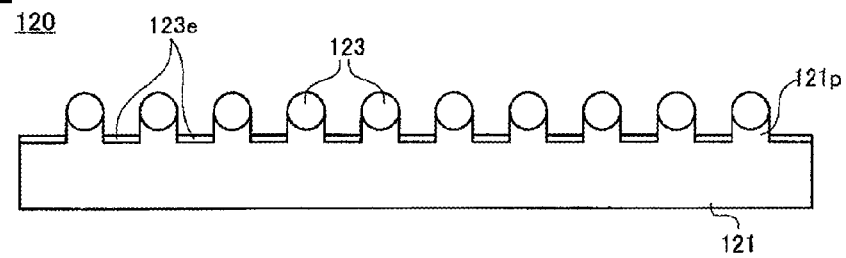

Instead of the steps up to the application of the anisotropic etching shown in FIG. 8C, for example, a stamper having recesses or projections in a nano-scale (about a pitch of 100 nm or less and, desirably, 20 nm to 50 nm) may be used. In this case, a substrate having recesses or columnar structures can be manufactured in an imprint process by pressing of the stamper. It is possible to improve throughput by using the nano-imprint process.

(2) Second Configuration Example of the Recording Medium

Figure 9:
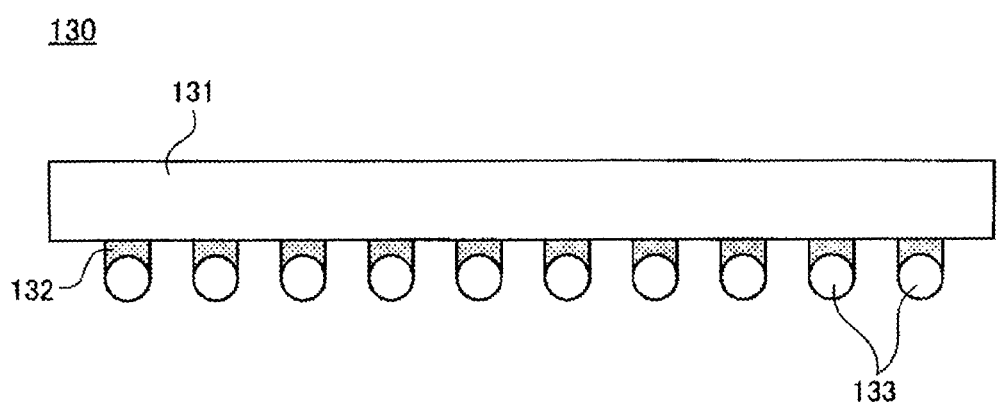
FIG. 9 is a sectional view of a recording medium used in the signal detecting method according to the second embodiment.

FIG. 9 is a sectional view of a recording medium 130 as a second configuration example. In this case, as in the above case, columnar structures 132 regularly arrayed at, for example, predetermined intervals and made of a material different from that of a substrate 131 are formed on the substrate 131 transparent to operating wavelength. Recording particulates 133 are formed on the columnar structures 132.

The columnar structures 132 can be made of a metal substance that causes plasmon resonance with respect to operating wavelength. With such a configuration, it can be expected that stronger coupling of the recording particulates 133 made of a phase change material and the near-field light generating section 1 is facilitated. Specifically, for example, any one of Mg, Pt, Au, Ag, and Al can be used.

Figure 10:
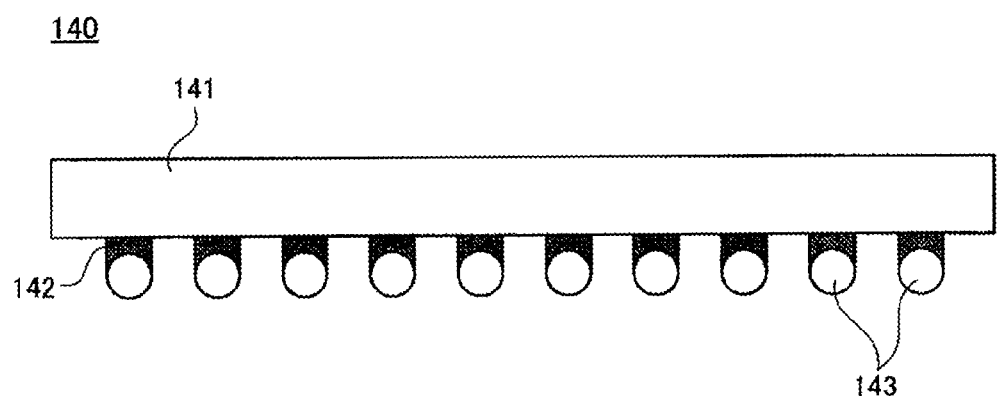
FIG. 10 is a sectional view of a recording medium used in the signal detecting method according to the second embodiment.

As shown in FIG. 10, as columnar structures 142 provided on a substrate 141 of a recording medium 140, a material that has a dielectric constant different from that of the substrate 141 and is sufficiently transparent to operating wavelength may be used. For example, by selecting a material having a refractive index smaller than a refractive index of the substrate 141 as the columnar structures 142, it is possible to highly efficiently facilitate energy injection recording particulates 143 made of a phase change material according to a light trapping effect in the columnar structure 142.

A method of providing such columnar structures 132 or 142 made of the materials different from that of the substrate and arranging and forming the recording particulates 133 or 143 on the columnar structures 132 or 142 is explained below as an example.

Figure 11A:
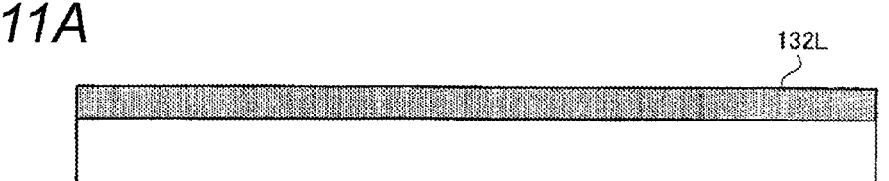
FIGS. 11A to 11F are manufacturing process charts illustrating a method of manufacturing a recording medium used in the signal detecting method according to the second embodiment.
Figure 11B:
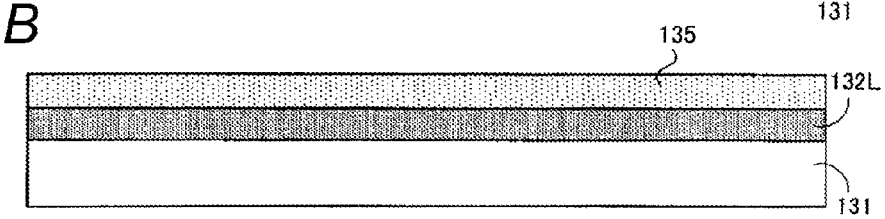
Figure 11C:
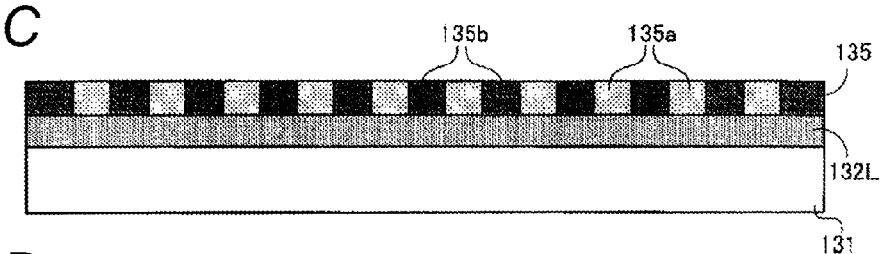
Figure 11D:
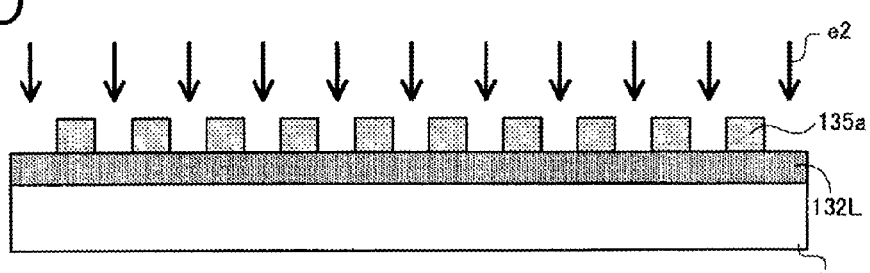
Figure 11E:
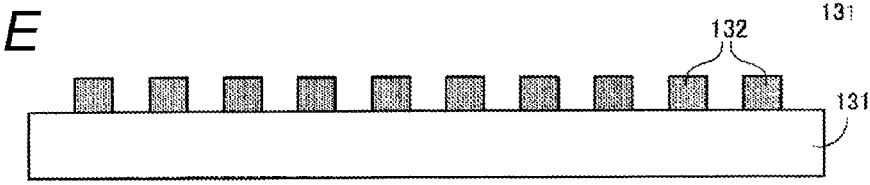
Figure 11F:
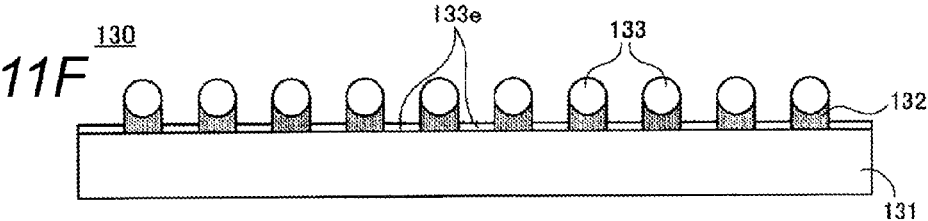

For example, as shown in FIGS. 11A to 11F, a metal (or dielectric) layer 132L is formed on the substrate 131 transparent to operating wavelength by sputtering or the like. Thereafter, as shown in FIG. 11B, a resist 135 is applied over the metal layer 132L by spin coating or the like. As shown in FIG. 11C, exposure is performed by ultraviolet ray irradiation or electron beam irradiation via a mask (not shown) such that exposed areas 135a and unexposed areas 135b are formed in a predetermined array. After development, as indicated by an arrow e2 in FIG. 11D, anisotropic etching such as RIE is applied from above. Consequently, as shown in FIG. 11E, the columnar structures 132 made of metal (or a dielectric) are formed. Thereafter, as shown in FIG. 11F, recording materials are formed by vapor deposition or the like. The thickness of the recording materials is selected to be smaller than the height of the columnar structures 132. In this way, recording films 133e formed among the columnar structures 132 and the recording particulates 133 on the columnar structures 132 do not come into contact with each other and are separated. The isolated recording particulates 133 can be formed on the columnar structures 132. As in the first configuration example, it is desirable to form the recording particulates 133 such that an outer diameter of the recording particulates 133 is equal to or larger than the width of the columnar structures 132. By forming the recording particulates 133 in this way, the volume of the recording particulates 133 is secured. It is possible to increase the number of polarizations, which contribute to coupling of near-field light and the phase change material, while keeping resolution of recording density. Therefore, it is possible to sufficiently change a dielectric constant and improve signal detection accuracy.

Figure 12A:
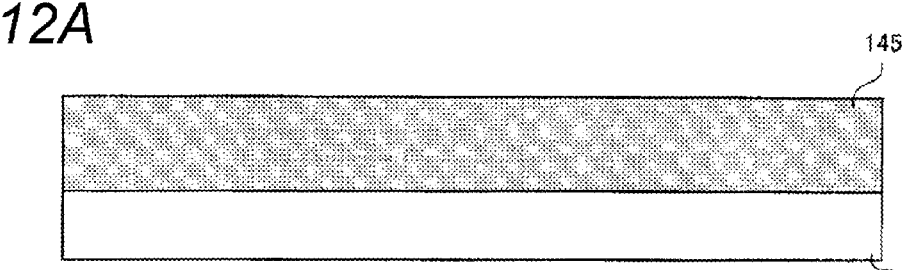
FIGS. 12A to 12E are manufacturing process charts illustrating a method of manufacturing a recording medium used in the signal detecting method according to the second embodiment.
Figure 12B:
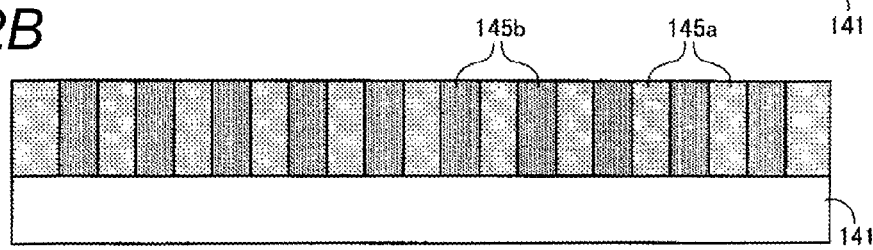
Figure 12C:
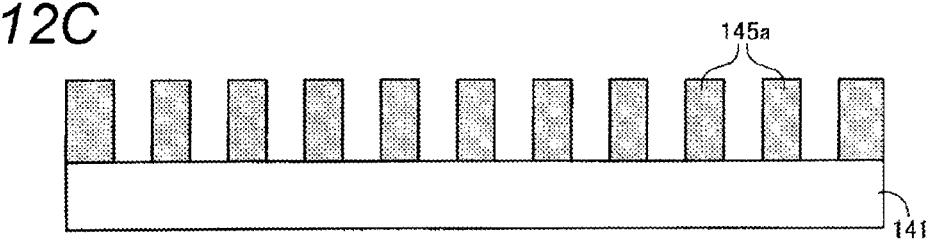
Figure 12D:
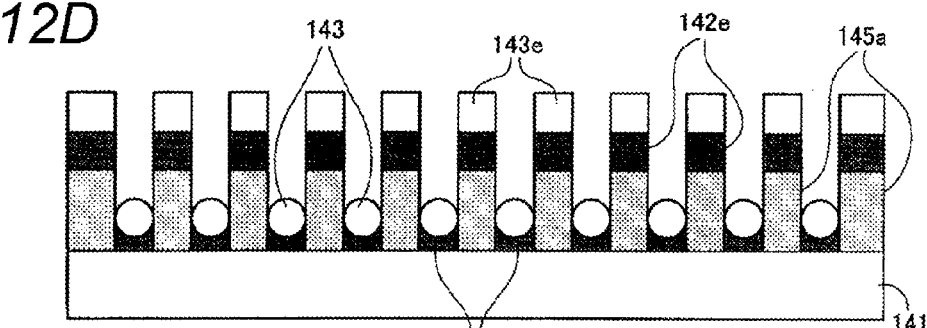
Figure 12E:
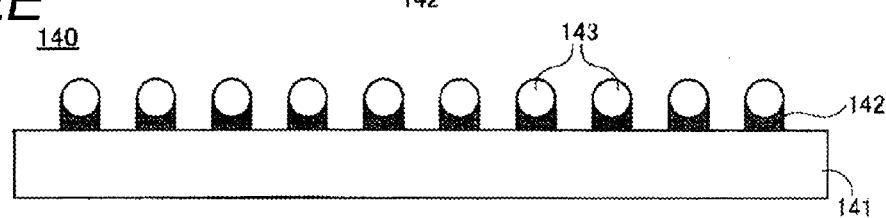

A manufacturing process shown in FIGS. 12A to 12E can also be used. In this case, as shown in FIG. 12A, a resist 145 is applied over the substrate 141 transparent to operating wavelength by spin coating or the like. Subsequently, as shown in FIG. 12B, exposed areas 145a and unexposed areas 145b are formed in a predetermined array by ultraviolet ray irradiation or electron beam irradiation via a mask (not shown). After performing development and leaving, for example, the exposed areas 145a as shown in FIG. 12C, as shown in FIG. 12D, a dielectric (or metal) material as columnar structures is formed and, subsequently, recording materials made of a phase change material are formed. The thickness of the exposed areas 145a and the thicknesses of the respective materials are selected such that columnar structures 142 made of the dielectric (or metal) material and the recording particulates 143 among the exposed areas 145a and dielectric (or metal) films 142e and recording films 143e on the exposed areas 145a are separated. Thereafter, by applying a lift-off process, as shown in FIG. 12E, the recording particulates 143 can be formed on the columnar structures 142 in a predetermined array.

(3) Third Configuration Example of the Recording Medium

Figure 13:
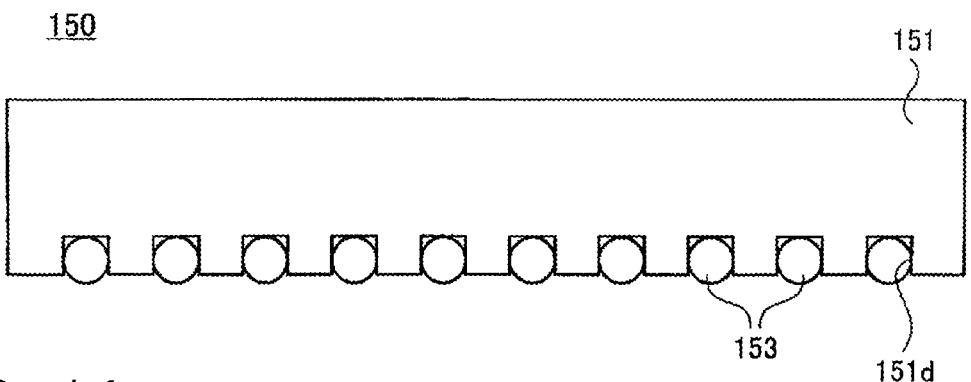
FIG. 13 is a sectional view of a recording medium used in the signal detecting method according to the second embodiment.

FIG. 13 is a sectional view of a recording medium 150 as a third configuration example. In this example, recesses 151d arrayed at predetermined intervals on a substrate 151 transparent to operating wavelength. Recording particulates 153 are arranged on an inner side of recesses 151d. Since the recording particulates 153 are arranged in the recesses 151d, an outer diameter of the recording particulates 153 is substantially the same as the width of the recesses 151d. In other words, it is possible to accurately form the outer diameter of the recording particulates 153 by accurately manufacturing the recesses 151d.

Figure 14:
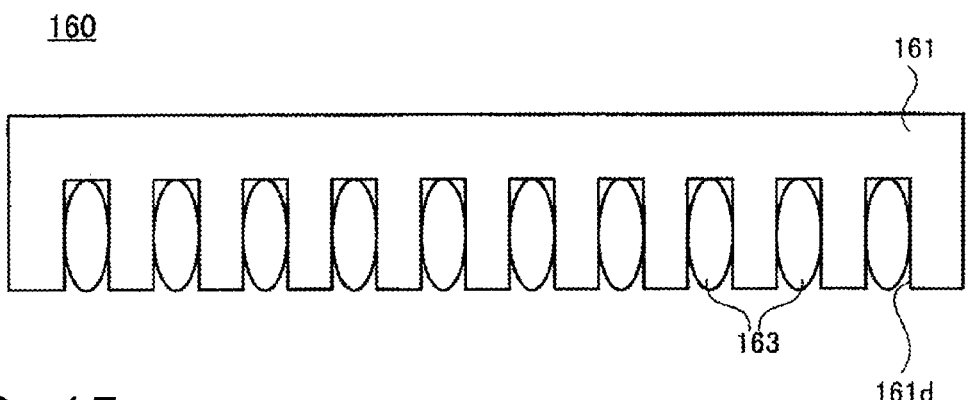
FIG. 14 is a sectional view of a recording medium used in the signal detecting method according to the second embodiment.

When the recesses are formed on the substrate in this way, for example, as shown in FIG. 14, recesses 161d having depth larger than width, i.e., a large aspect ratio of the depth with respect to the width may be formed on a substrate 161. Recording particulates 163 having height larger in a depth direction than width, i.e., a large aspect ratio of the height with respect to the width may be arranged and formed in the inside of the substrate 161.

Figure 15:
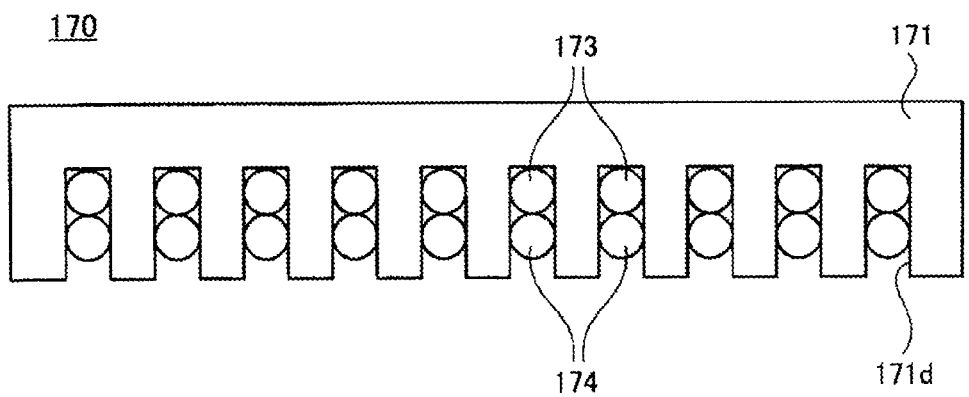
FIG. 15 is a sectional view of a recording medium used in the signal detecting method according to the second embodiment.

Further, as shown in FIG. 15, recesses 171d also having a large aspect ratio of depth with respect to width can be formed on a substrate 171 and substantially spherical recording particulates 173 and 174 can be formed in the inside of the substrate 171. By setting the depths of the recesses 161d and 171d large and giving the large aspect ratios to the recesses, it is possible to increase the number of polarizations, which contribute to coupling of near-field light and a phase change material, without deteriorating resolution of recording density. It is possible to improve signal detection accuracy.

Figure 16A:
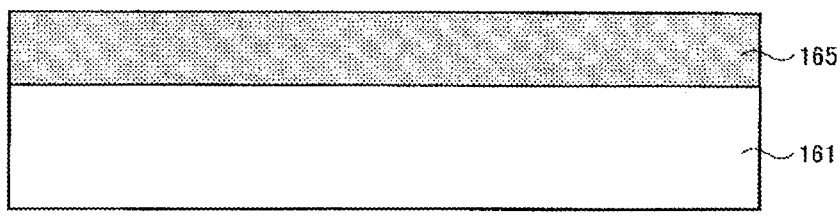
FIGS. 16A to 16F are manufacturing process charts illustrating a method of manufacturing a recording medium used in the signal detecting method according to the second embodiment.
Figure 16B:
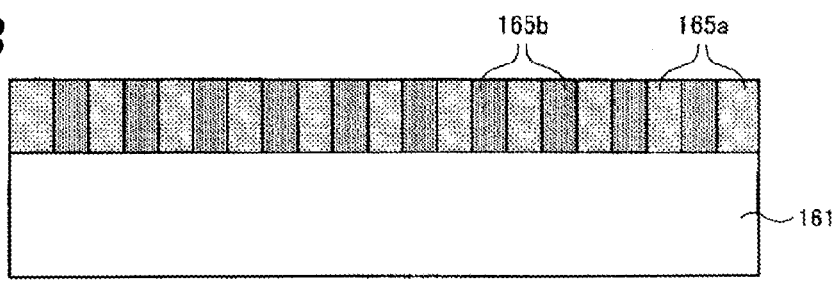
Figure 16C:
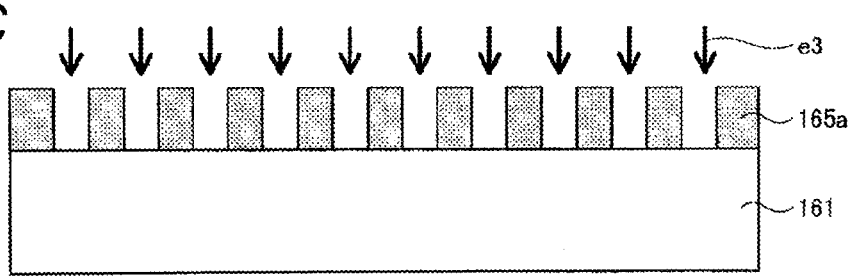
Figure 16D:
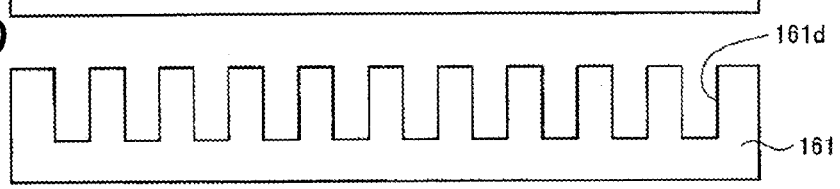
Figure 16E:
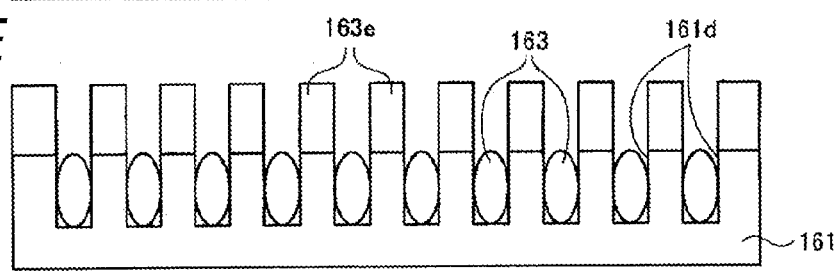
Figure 16F:
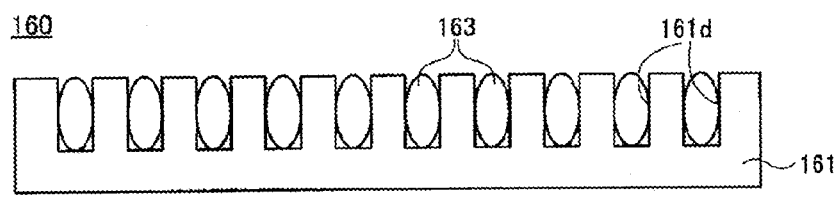

As an example of a manufacturing method in this case, an example of manufacturing of the structure shown in FIG. 14 is explained. First, as shown in FIG. 16A, the resist 165 is applied over the substrate 161 transparent to operating wavelength by spin coating or the like. Although not shown in the figure, when metal layers or dielectric layers other than recording particulates are provided in recesses, metal materials or dielectric materials may be formed by sputtering or the like in advance and the resist 161 may be formed on the metal materials or the dielectric materials. As shown in FIG. 16B, the exposed areas 165a and 165b are formed in a predetermined array by ultraviolet ray irradiation or electron beam irradiation via a mask (not shown). After development, anisotropic etching is applied from one direction as indicated by an arrow e3 in FIG. 16C. Consequently, as shown in FIG. 16D, the recesses 161d arrayed according to a predetermined rule are formed. Thereafter, recording materials made of a phase change material are formed by vapor deposition, sputtering, or the like. The recording particulates 163 in the recesses 161d and recording films 163e formed outside the recesses 161d are separated by selecting the depth of the recesses 161d and the thickness of the recording films 163e. Thereafter, as shown in FIG. 16F, the recording films 163e outside the recesses 161d are removed by applying surface polishing.

As in the example shown in FIG. 13, it is also possible to form the substantially spherical recording particulates 153 by appropriately selecting a ratio of the width and the depth of recesses. As shown in FIG. 15, it is also possible to form the substantially spherical recording particulates 173 and 174 in the recesses 171d in a layer shape by dividing a film formation process for recording films shown in FIG. 16E into two or more times of processes.

(4) Fourth Configuration Example of the Recording Medium

Figure 17:
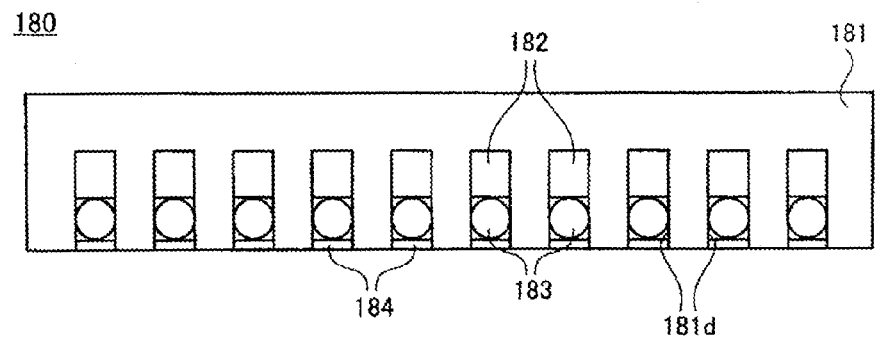
FIG. 17 is a sectional view of a recording medium used in the signal detecting method according to the second embodiment.

FIG. 17 is a sectional view of a recording medium 180 as a fourth configuration example. In this example, recesses 181d arrayed at predetermined intervals are formed on a substrate 181 transparent to operating wavelength. The recesses 181d are formed in a shape having depth larger than width. Metal layers 182 made of, for example, metal that cause plasmon resonance with respect to operating wavelength are formed in the recesses 181d. Recording particulates 183 made of a phase change material are arranged on the metal layers 182. Dielectric layers 184 are formed at the top in the recesses 181d. Since the metal layers 182 are provided in a part in the recesses 181d, it can be expected that stronger coupling of the recording particulates 183 made of the phase change material and the near-field light generating section 1 is facilitated. Specifically, for example, any one of Mg, Pt, Au, Ag, and Al can be used. If transparent members having a refractive index different from that of the substrate 181 are arranged as dielectric layers 184 at least in a part in the recesses 181d, it can be also expected that a light trapping effect in the recesses 181d is facilitated. In this case, an effect of the transparent member as a protective film can also be expected.

Figure 18A:
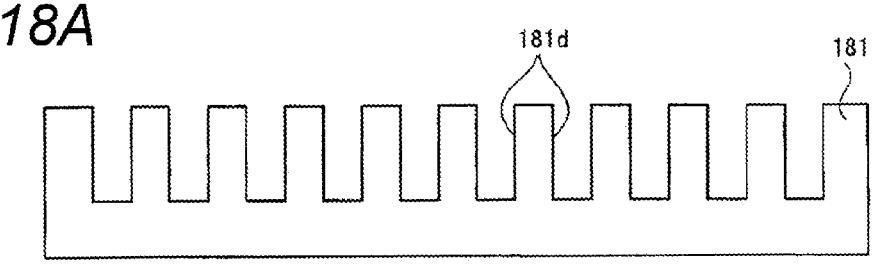
FIGS. 18A to 18C are manufacturing process charts illustrating a method of manufacturing a recording medium used in the signal detecting method according to the second embodiment.
Figure 18B:
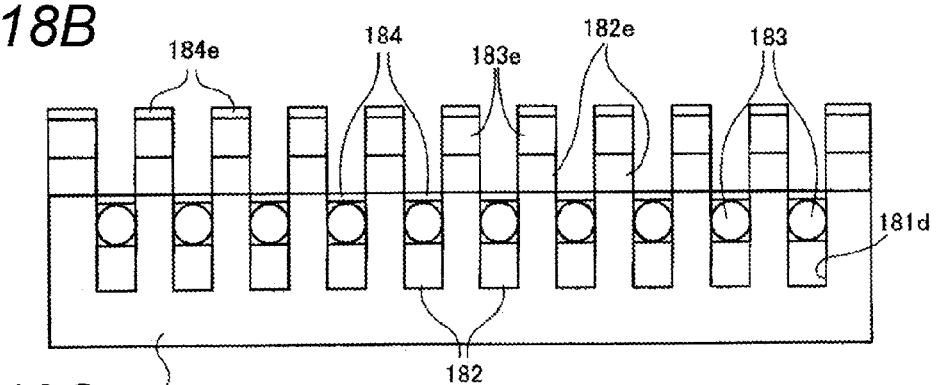
Figure 18C:
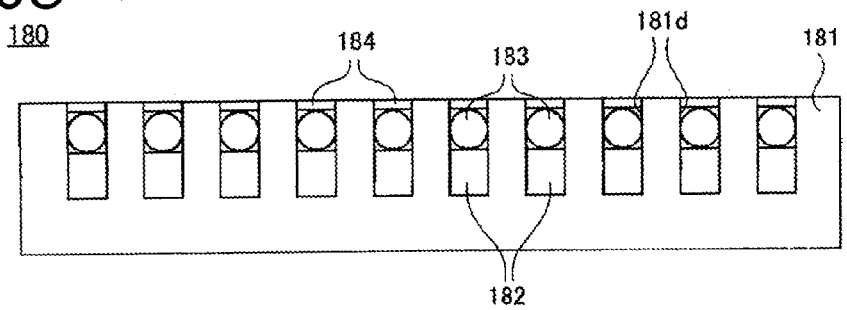

An example of a manufacturing method in this case is shown in FIGS. 18A to 18C. First, the recesses 181d are formed on the substrate 181 in a predetermined array through steps same as those shown in FIGS. 16A to 16C. Subsequently, metal materials, recording materials, and dielectric materials are formed as shown in FIG. 18B by vapor deposition, sputtering, or the like. As in the examples explained above, the thicknesses of the respective materials and the depth of the recesses 181d are appropriately selected such that the metal layers 182, the recording particulates 183, and the dielectric layers 184 in the recesses 181d and the metal materials 182e, the recording materials 183e, and the dielectric materials 184e on the recesses 181d are separated. Thereafter, surface polishing is performed to remove the respective materials other than the recesses 181d as shown in FIG. 16C. Consequently, a recording medium 180 having a configuration shown in FIG. 17 can be obtained.

The recesses 181d of the substrate 181 can also be formed by, besides the lithography and the nano-implant, other various techniques in the past such as anodic oxidation coating.

(5) Analysis Example of a Recording Particulate Shape

An analysis example performed when near-field light is irradiated on the recording medium 110 formed by regularly arraying the recording particulates 112 on the substrate 111 sufficiently transparent to operating wavelength is explained. In this example, a result obtained by analyzing that recording can be performed with high efficiency and high resolution by injecting energy into the recording particulates 112 of the recording medium 110 using a scatterer that generates near-field light. In an example of analysis explained below, recording is performed by a scatterer that causes normal plasmon resonance. When the recording is satisfactorily performed, it can be predicted that satisfactory reproduction can be performed with a recording medium used in the signal detecting device and the signal detecting method according to the embodiment of the present invention. In other words, it is desirable to use, in the signal detecting device and the signal detecting method according to the embodiment of the present invention, a recording medium having recording particulates of a shape in which satisfactory recording is performed by analysis.

In the analysis example explained below, as a near-field light generating section, a scatterer, i.e., a so-called antenna, a material of which is Au, a surface parallel to a substrate plane of which was a regular triangular shape (a curvature of vertexes is 10 nm and the length of sides is 115 nm), and the thickness of which is 30 nm, formed on a substrate made of $SiO_2$ was used. When one vertex of the antenna of the regular triangular shape was set as an incident light center position during irradiation of light, the antenna was arranged such that a perpendicular direction to the opposite side of the vertex and a polarizing direction of the incident light coincided with each other. As a condition for forming a near-field light spot, light having wavelength of 780 nm near a resonance condition in this configuration was irradiated from the substrate side.

As the recording medium, on a substrate made of $SiO_2$ sufficiently transparent to irradiated light optically, columnar structures made of a material same as that of the substrate were regularly arrayed. Phase change recording particulates made of GeSbTe were arranged on the columnar structures. A diameter of the recording particulates was set to 20 nmφ and an array pitch of the columnar structures was set to 40 nm. A distance between the antenna and the recording particulates was set to 5 nm.

Figure 19A:
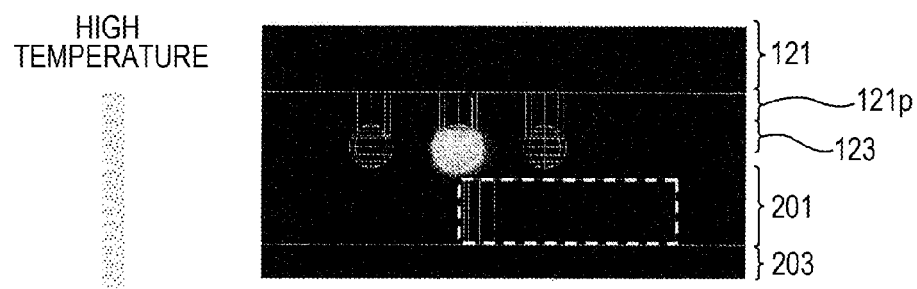
FIGS. 19A and 19B are diagrams of a result obtained by analyzing temperature distribution in the case in which near-field light is irradiated on a recording medium by an antenna.
Figure 19B:
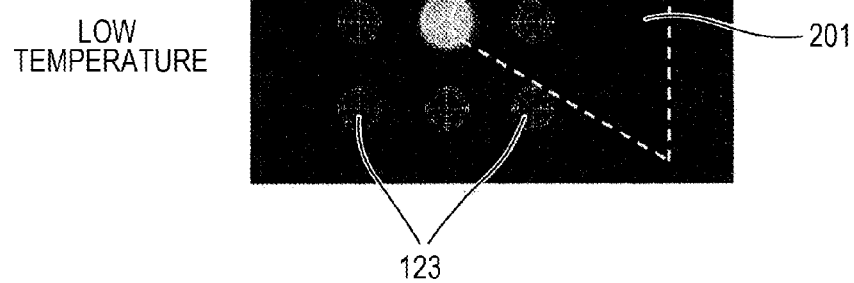

Under such a condition of the configuration, energy injection to the GeSbTe recording particulates by the near-field light spot is calculated by using an FDTD (Finite Difference Time Domain) method. A state of heat distribution at the time when energy injection sufficient for a phase change from a crystal phase to an amorphous phase is applied is shown in FIGS. 19A and 19B. In FIG. 19A, a heat distribution diagram of the recording medium and the antenna viewed from the lateral direction is shown. In FIG. 19B, a heat distribution diagram of the recording medium and the antenna viewed from above is shown. The columnar structures 121p are formed on the substrate 121 made of $SiO_2$ and the recording particulates 123 are arranged on the columnar structures 121p. As the near-field light generating section, an antenna 201 made of Au is provided on a substrate 203 made of $SiO_2$. It is seen that the GeSbTe recording particulates 123 in the center are selectively heated by a local near-field light spot at the distal end of the antenna 201 without causing temperature rise in the adjacent GeSbTe particulates 123. Maximum reachable temperature is about 500° C. The GeSbTe recording particulates 123 can reach melting temperature of bulk GeSbTe. On the other hand, it is seen that, if the columnar structures 121p and the substrate 121, which are sections that support the recording particulates 123, are made transparent to operating wavelength, diffusion of heat is suppressed, only the target single recording particulate 123 is heated, and information recording can be selectively and efficiently performed.

Figure 20:
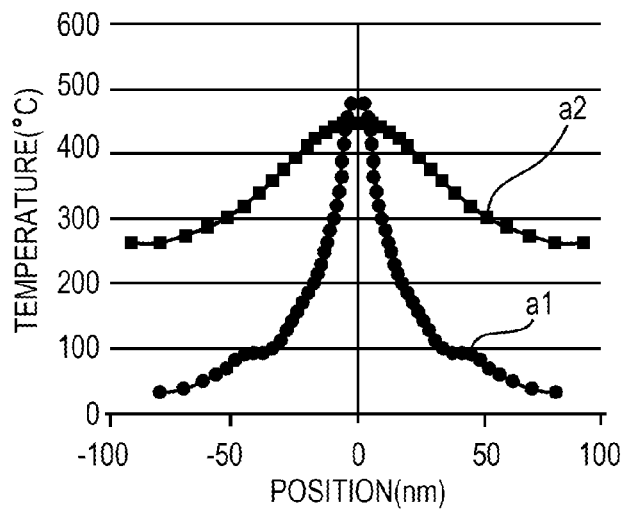
FIG. 20 is a graph of a result obtained by analyzing temperature distributions in the case in which a recording section is formed of particulates and when the recording section is formed of a continuous film.

A graph indicating thermal resolution with reference to the GeSbTe recording particulates 123 in that case is shown in FIG. 20. For comparison, a heat distribution calculation result obtained when the same antenna 201 for near-field light generation is used and uniform GeSbTe continuous films having the thickness of 10 nm are arranged in a position 5 nm apart from the upper surface of the antenna 201 in parallel to the upper surface is shown in the figure. In FIG. 20, a solid line a1 indicates heat distribution obtained when the recording particulates 123 are arranged on the columnar structure 121p. A solid line a2 indicates temperature distribution obtained when the continuous films are arranged.

In the case of the continuous films, a half width of the heat distribution is a little smaller than 100 nm with respect to a half width of about 30 nm of the heat distribution in the columnar structures 121p. This is because diffusion of heat into the film occurs. A phase-changing area during recording is considered to increase. Therefore, if phase changing films are the continuous films, it is considered difficult to improve recording density even if a local near-field light spot is used. Therefore, it is seen that diffusion of heat can be suppressed and heat decomposition performance is clearly improved by using the columnar structures 121p transparent to operating wavelength as sections that support the recording particulates 123 made of the phase change material.

The same result was obtained when a material sufficiently transparent to operating wavelength such as quartz glass, SiC, AlP, ZnO, ZnS, ZnSe, GaN, and $TiO_2$ was used as the substrate 203 and a material of the antenna 201 was rare metal such as Pt, Mg, Al, and Ag. Even when a shape of the antenna 201 was an ellipse, a triangle having an acute angle, and a triangle having an obtuse angle, an equivalent effect was obtained by selecting wavelength around resonant frequency for the configuration.

The same held true in the recording medium. The same result was obtained when the materials and the configurations of the recording particulates indicated as the first to fourth configuration examples were adopted. A phase change from the amorphous phase to the crystal phase indicates the same tendency.

Temperature rise in the antenna 201 is small compared with a temperature changing ratio and an absolute value of temperature in the recording particulates 123. The temperature rise may be suppressed by forming a cooling path or an exhaust heat path, for example, by setting a heat sink made of a substance with high heat conduction such as Al in contact with the antenna 201. It can be expected that a degree of the temperature rise and relative temperature to the recording particulates 123 can be suppressed by contriving shapes, materials, configurations, and the like of the antenna 201 and the substrate 203.

The effects explained above are realized not only in the columnar structures 121p but also in the case of a configuration in which the recording particulates 112 are regularly arrayed on the substrate 111 shown in FIG. 6 and in the case of a regular array by an embedded structure in the recesses 151d shown in FIG. 13.

An analysis example in the case in which recoding particulates made of a phase change material are arranged in regularly-arranged recesses is explained below. In this analysis example, as in the analysis example explained above, the near-field light generating section including the Au antenna and the SiO₂ substrate was used. As shown in FIG. 13, when the recording particulates 153 made of a GeSbTe phase change material were regularly arrayed in the recesses 151d, effects equivalent to those in the case of the columnar structures were obtained.

Further, as shown in FIG. 14, by increasing the depth of the recesses 161d and using the phase change recording particulates 163 with an aspect ratio of the depth with respect to the width set large, it is possible to increase the number of polarizations, which contribute to coupling of the near-field light and the phase change material, without deteriorating resolution of recording density. In an example explained below, the bar-like recording particulates 163 made of GeSbTe having width w fixed to 20 nm as indicated by a section of the recording particulate 163 shown in FIG. 21 are embedded in the regularly-arranged recesses 161d shown in FIG. 14.

Figure 21:
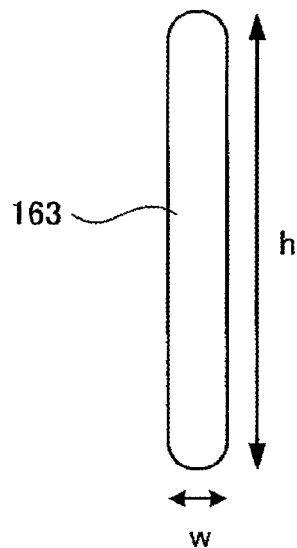
FIG. 21 is a diagram for explaining an aspect ratio of recording particulars.
Figure 22:
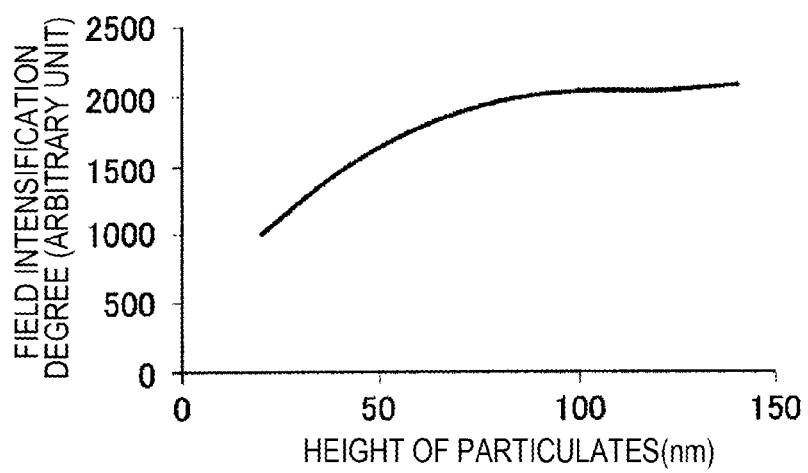
FIG. 22 is a graph of a result obtained by analyzing a field intensification degree in the case in which the width of the recording particulates is fixed and the height thereof is changed.

Height h shown in FIG. 21 was changed and shift of a field intensification degree in lower parts of the GeSbTe recording particulates 163 under the generation of near-field light from the antenna 201 having the shape explained in the analysis example shown in FIGS. 19A and 19B was analyzed. A result of the analysis is shown in FIG. 22. It is seen that as an aspect ratio h/w increases, the intensification degree increases to almost double. It is predicted that the field intensification degree is nearly saturated when the aspect ratio h/w of the recording particulates 163 made of GeSbTe is about 10. This is considered to be because, when the aspect ratio increases to exceed a certain degree, polarization phases in the bar-like GeSbTe recording particulates 163 are disarranged by irradiation of near-field light and the effect of the polarization phases is weakened. It is difficult to manufacture the recording particulates 163 with an aspect ratio exceeding 10. Therefore, it is desirable to set the aspect radio h/w of the recording particulates 163 to be equal to or larger than 1 and equal to or smaller than 10.

Figure 23:
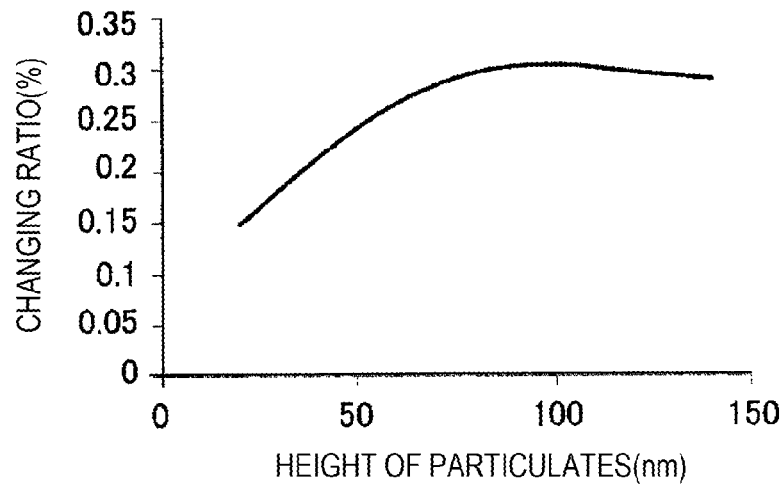
FIG. 23 is a graph of a result obtained by analyzing a rate of change in field intensification in a lower part of the recording particulates in the case in which the width of the recording particulate is fixed and the height thereof is changed.
Figure 24:
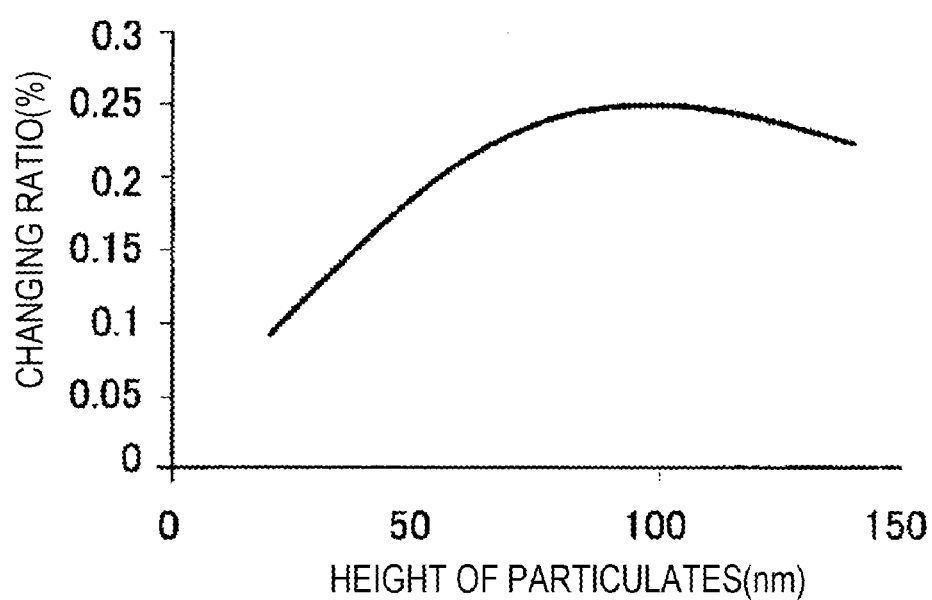
FIG. 24 is a graph of a result obtained by analyzing a rage of change in field intensification at a distal end of an antenna in the case in which the width of the recording particulates is fixed and the height thereof is changed.

In FIGS. 23 and 24, a changing ratio P of field intensification due to a difference in a dielectric constant in a phase state defined below is shown concerning the lower parts of the GeSbTe recording particulates 163 and the distal end position of the Au antenna, respectively. I crystal and I amorphous represent intensities in the crystal phase and the amorphous phase of the recording particulates 163, respectively. The changing ratio P is represented by Formula 1 below.

$$P = \frac{|I_{crystal}, I_{amorphous}|}{\max(I_{crystal}, I_{amorphous})}$$

As in the case of the field intensification degree shown in FIG. 22, it is seen that the changing ratio P due to the phase state in the lower parts of the GeSbTe recording particulates 163 increases to almost double at the maximum compared with that in the case of the aspect ratio h/w=1 (the changing ratio 0.15 in the case of h=20). It is also seen that, in the distal end position of the Au antenna, the changing ratio P increase to more than double and nearly triple at the maximum compared with the changing ratio of about 0.9 in the case of h=20.

Therefore, it is seen that, by setting the aspect ratio (h/w) of the recording particulates 163 made of the phase change material, it is possible to more efficiently detect a change in the phase state without deteriorating resolution during recording.

From the above explanation, it is seen that it is possible to perform recording and reproduction with high resolution and high efficiency by using the recording medium 160 in which the recording particulates 163 with the increased aspect ratio are formed in the recesses 161d regularly arrayed in the substrate 161 transparent to operating wavelength.

In this way, it is possible to increase the number of polarizations in the recording particulates 163 related to the mutual action with the near-field light by forming the recording particulates 163 in a nanometer size having the large aspect ratio h/w. In this case, it is possible to maintain a recording size in an in-plane direction of the recording particulates 163 in a bit size and prevent resolution from falling. Consequently, when reproduction is performed by the signal detecting device 50, it is possible to increase the near-field light generation intensity in the interface between the near-field light generating section 1 and the semiconductor substrate 3 according to a difference in a state of the recording medium 160. Therefore, it is possible to accurately reproduce a signal. In particular, it is seen from the results shown in FIGS. 23 and 24 that, when the aspect ratio is increased to nearly 10 while a recording particulate size in a recording medium in-plane direction as a recording mark size is maintained, a difference in generated near-field light intensity is made conspicuous. This makes it possible to improve detection efficiency for a reproduced signal.

As explained above, in the signal detecting device and the signal detecting method according to the embodiments of the present invention, it is possible to recording density exceeding 1 Tbit/inch², which is not easily realized by the phase change light recording system in the past, by using the recording media having the configurations explained above. In other words, it is possible to intensify a light reproduction signal from a phase change recording medium including recording particulates of a bit size in a 10 nm order and satisfactorily perform signal detection.

The present invention is not limited to the configurations explained in the embodiments. Various modifications and alterations are possible without departing from the spirit of the present invention in, for example, shapes of the near-field light generating section and the electrode and optical systems that lead light from the light source to the near-field light generating section.

For example, a relation between band-gap energy that causes a two-photon absorption processing and wavelength is not limited to the relation in which the wavelength is accurately a half as large as the band-gap energy. The relation between band-gap energy and the wavelength only has to be in a range in which satisfactory signal output and reproduction characteristic are obtained in the detection of a photocurrent obtained by the two-photon absorption process.

The present application contains subject matter related to that disclosed in Japanese Patent Priority Applications JP 2008-153184 and 2008-334888 filed in the Japan Patent Office on Jun. 11, 2008 and Dec. 26, 2008, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal detecting device comprising:
   a semiconductor substrate;
   a near-field light generating section that is provided on the semiconductor substrate and generates near-field light near an interface with the semiconductor substrate;
   a light source that outputs light having a wavelength corresponding to photon energy about half as large as a band-gap energy of a material of the semiconductor substrate; and a current detecting unit that detects a photocurrent generated in the semiconductor substrate when the near-field light is generated.

2. The signal detecting device according to claim 1, wherein the near-field light generating section is a scatterer that has a longitudinal direction thereof in a field oscillation direction of the light from the light source.

3. The signal detecting device according to claim 2, wherein the near-field light generating section includes any one of Pt, Mg, Au, Ag, and Al or at least any one of Pt, Mg, Au, Ag, and Al.

4. The signal detecting device according to claim 1, wherein the semiconductor substrate includes any one of SiC, AlP, ZnO, ZnS, ZnSe, GaN, and $TiO_2$.

5. The signal detecting device according to claim 4, wherein the light source outputs light having a wavelength in a wavelength band equal to or larger than 344 nm and equal to or smaller than 992 nm.

6. A signal detecting method comprising steps of:
causing a near-field light generating section provided on a semiconductor substrate to travel opposed to and relatively to a recording medium having a recording section, a dielectric constant of which changes according to recorded information;
irradiating light having a wavelength corresponding to photon energy about half as large as band-gap energy of a material of the semiconductor substrate on the near-field light generating section to generate near-field light near an interface between the near-field light generating section and the semiconductor substrate;
causing a surface of the recording section, the dielectric constant of which changes, of the recording medium and the near-field light generating section to interact to change near-field light intensity in the semiconductor substrate; and
detecting a change in photocurrent caused by absorption of two photons of the near-field light in the semiconductor substrate to detect the recorded information of the recording medium.

7. The signal detecting method according to claim 6, wherein the recording section of the recording medium is formed by regularly arraying recording particulates on a substrate transparent to operating wavelength, wherein the recording particulates change phase with light or heat.

8. The signal detecting method according to claim 7, wherein the recording particulates are embedded in recesses regularly arrayed on the substrate.

9. The signal detecting method according to claim 8, wherein a diameter of the recesses is substantially the same as an outer diameter of the recording particulates.

10. The signal detecting method according to claim 6, wherein dielectric layers or metal layers made of a material different from that of the substrate are formed in lower parts of the recording particulates.

11. The signal detecting method according to claim 8, wherein an aspect ratio of the recesses is equal to or larger than 1 and equal to or smaller than 10.

12. The signal detecting method according to claim 7, wherein the recording particulates are arranged on columnar structures formed on the substrate.

13. The signal detecting method according to claim 12, wherein a height of the columnar structures is larger than an outer diameter of the recording particulates.

14. The signal detecting method according to claim 12, wherein a part of the columnar structures include any one of Mg, Pt, Au, Ag, and Al.

15. A recording medium comprising:
a recording section made of a first material, a dielectric constant of which changes according to recorded information,
wherein, when light having a second wavelength corresponding to photon energy about half as large as a band-gap energy of a material of a semiconductor substrate is irradiated on a near-field light generating section in a state in which the near-field light generating section provided in the semiconductor substrate is caused to travel opposed to and relatively to the recording section, the recording section changes near-field light intensity generated near an interface between the near-field light generating section and the semiconductor substrate according to a change in the dielectric constant of the recording section.

\* \* \* \* \*